(12) United States Patent
Fernald et al.

(10) Patent No.: US 6,597,711 B2
(45) Date of Patent: Jul. 22, 2003

(54) BRAGG GRATING-BASED LASER

(75) Inventors: Mark R. Fernald, Enfield, CT (US); Timothy J. Bailey, Longmeadow, MA (US); Matthew B. Miller, Glastonbury, CT (US); James M. Sullivan, Manchester, CT (US); Michael A. Davis, Glastonbury, CT (US); Robert N. Brucato, Waterbury, CT (US); Martin A. Putnam, Cheshire, CT (US); Alan D. Kersey, South Glastonbury, CT (US); Paul E. Sanders, Madison, CT (US); Jon T. Kringlebotn, Tondheim (NO)

(73) Assignee: CiDRA Corporation, Wellingford, CT (US)

( * ) Notice: Subject to any disclaimer, the term of this patent is extended or adjusted under 35 U.S.C. 154(b) by 0 days.

(21) Appl. No.: 10/146,773

(22) Filed: May 16, 2002

(65) Prior Publication Data

US 2003/0021306 A1 Jan. 30, 2003

Related U.S. Application Data

(63) Continuation-in-part of application No. 09/707,084, filed on Nov. 6, 2000, which is a continuation-in-part of application No. 09/691,997, filed on Oct. 19, 2000, now Pat. No. 6,363,089, which is a continuation of application No. 09/456,112, filed on Dec. 6, 1999, now Pat. No. 6,229,827, which is a continuation-in-part of application No. 09/400,362, filed on Sep. 20, 1999, now abandoned, which is a continuation-in-part of application No. 09/205,846, filed on Dec. 4, 1998, now abandoned.

(51) Int. Cl.$^7$ .............................. H01S 3/10

(52) U.S. Cl. .................. 372/20; 372/6; 372/64; 372/92

(58) Field of Search ................. 372/20, 6, 64, 372/92; 385/37; 359/568, 569

(56) References Cited

U.S. PATENT DOCUMENTS

| 5,469,520 | A | * | 11/1995 | Morey et al. ................ 385/37 |
| 5,691,999 | A | * | 11/1997 | Ball et al. .................... 372/20 |
| 6,229,827 | B1 | * | 5/2001 | Fernald et al. .............. 372/20 |
| 6,363,089 | B1 | * | 3/2002 | Fernald et al. .............. 372/20 |
| 6,422,084 | B1 | * | 7/2002 | Fernald et al. .............. 73/705 |
| 2001/0051019 | A1 | * | 12/2001 | Bailey et al. ................ 385/37 |
| 2002/0154860 | A1 | * | 10/2002 | Fernalds et al. ............. 385/37 |

* cited by examiner

Primary Examiner—Leon Scott, Jr.

(57) ABSTRACT

A compression-tuned Bragg grating-based laser 800 includes a pair of optical grating elements 802,804 wherein at least one of the grating elements is tunable by a compression device 812,814. The grating elements may include either an optical fiber 10 having at least one Bragg grating 12 impressed therein encased within and fused to at least a portion of a glass capillary tube 20 or a large diameter waveguide grating element 600 having a core and a wide cladding. The tunable grating element(s) 802,804 are axially compressed, which causes a shift in the reflection wavelength of the gratings 807,809 without buckling the element. The shape of the element may be other geometries (e.g., a "dogbone" shape) and/or more than one grating or pair of gratings may be used and more than one fiber 10 or core 612 may be used. A gain element, such as Erbium doped fiber, is optical disposed between the grating elements to provide the lasing cavity.

75 Claims, 18 Drawing Sheets

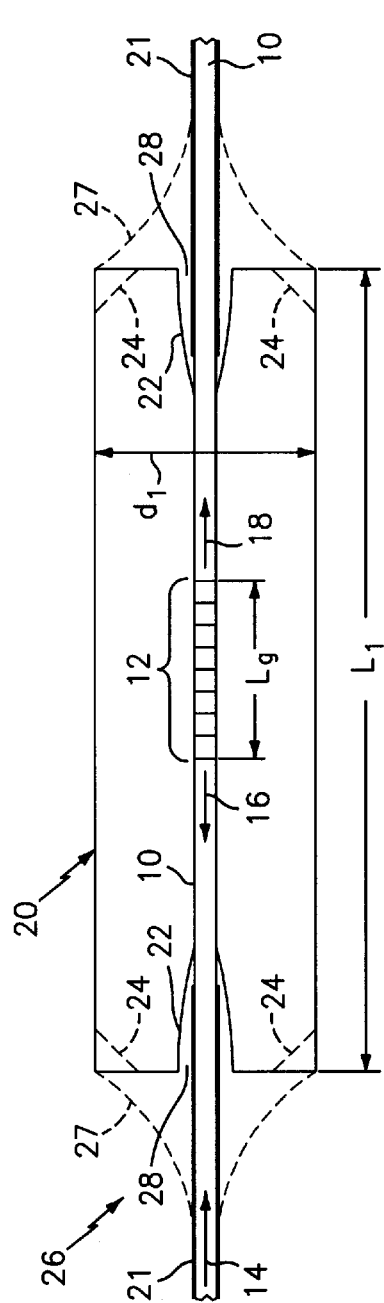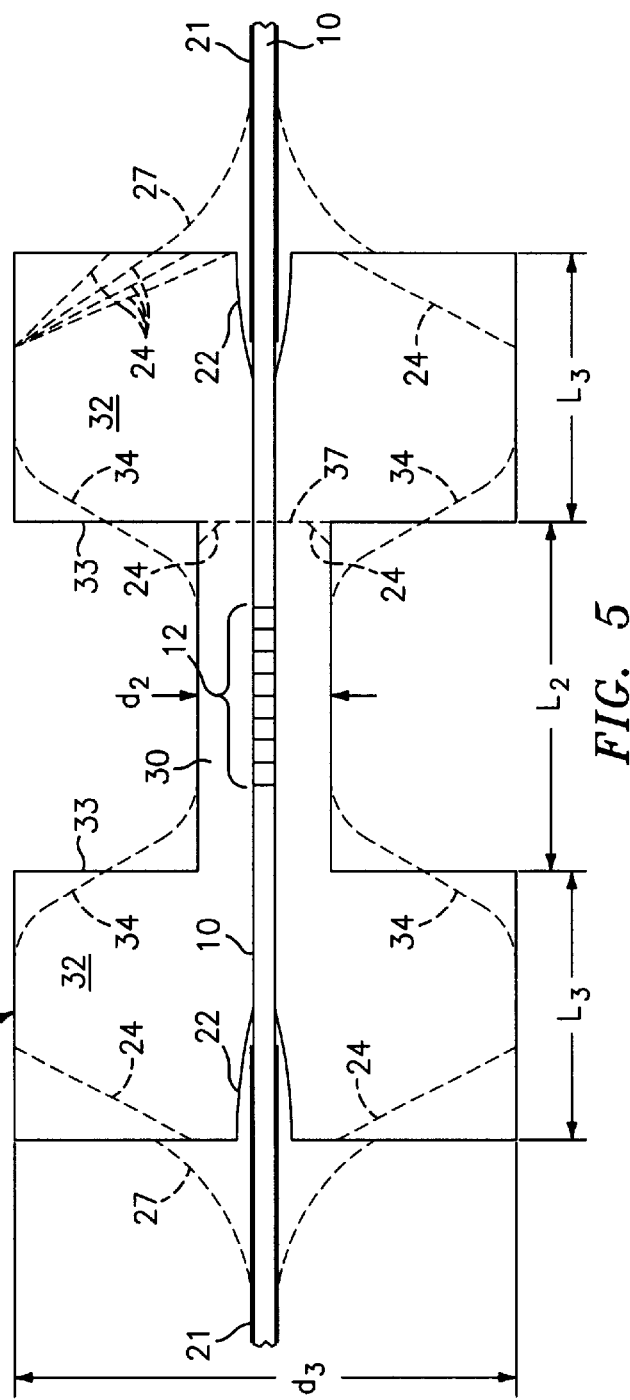

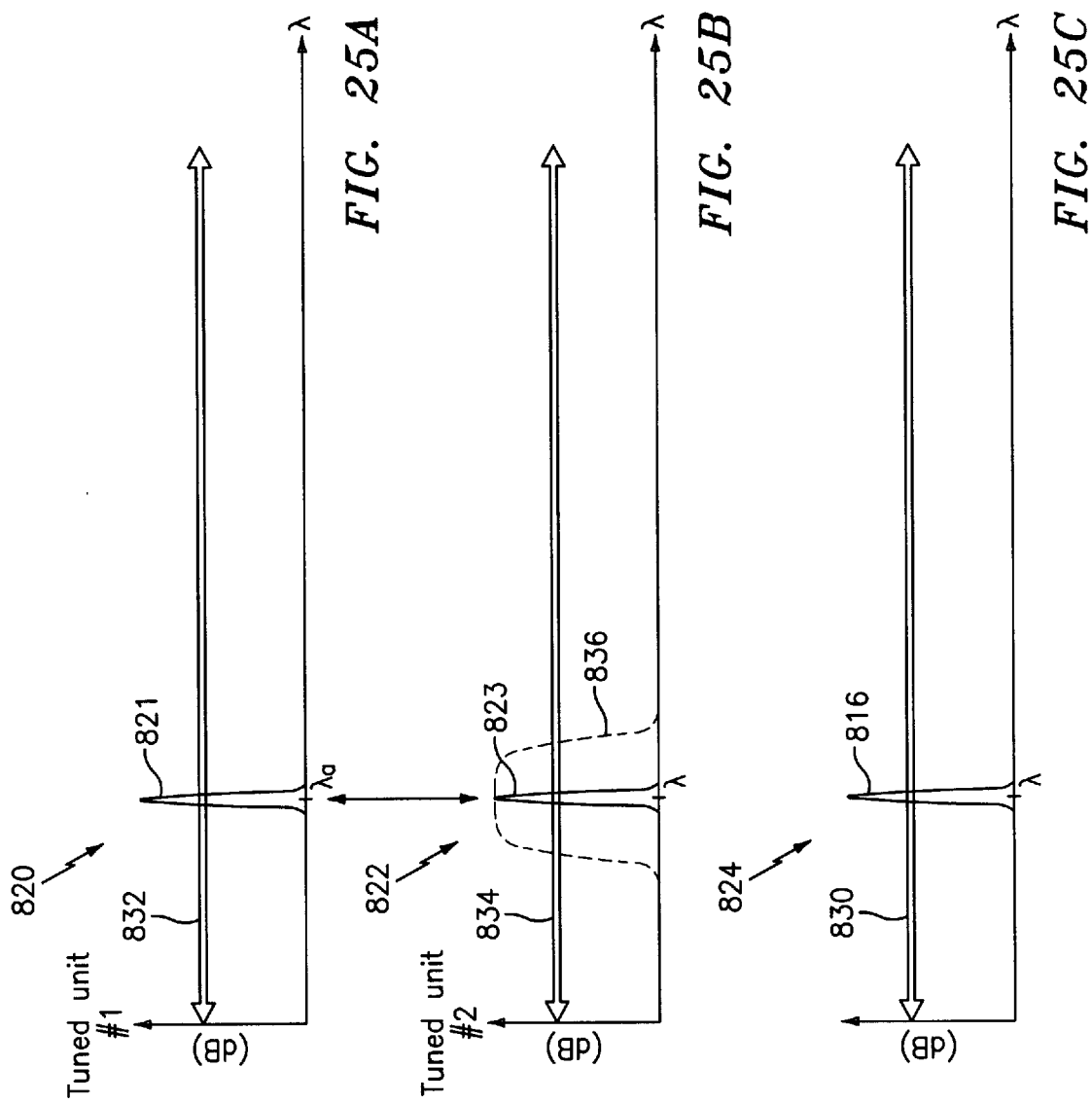

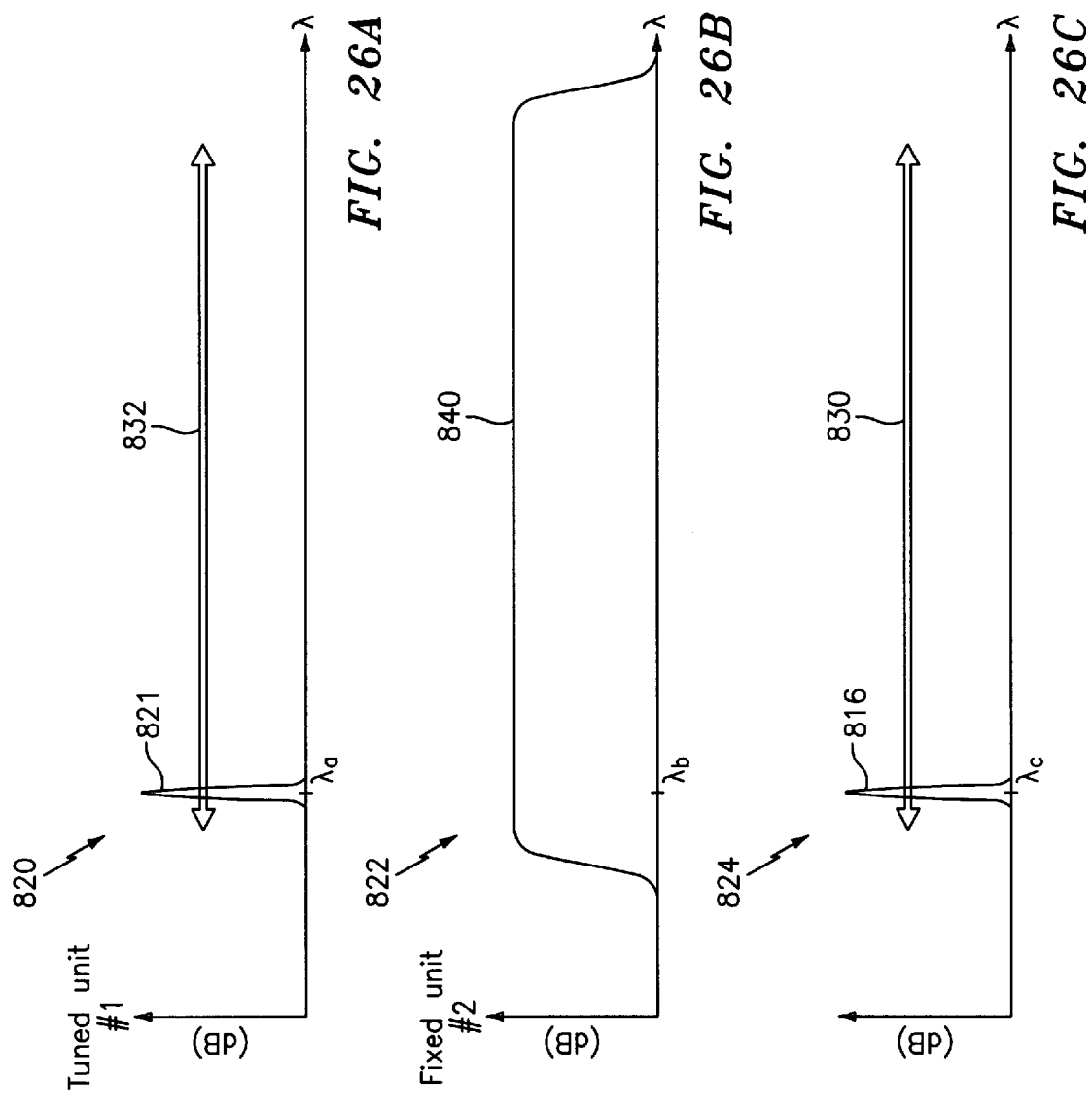

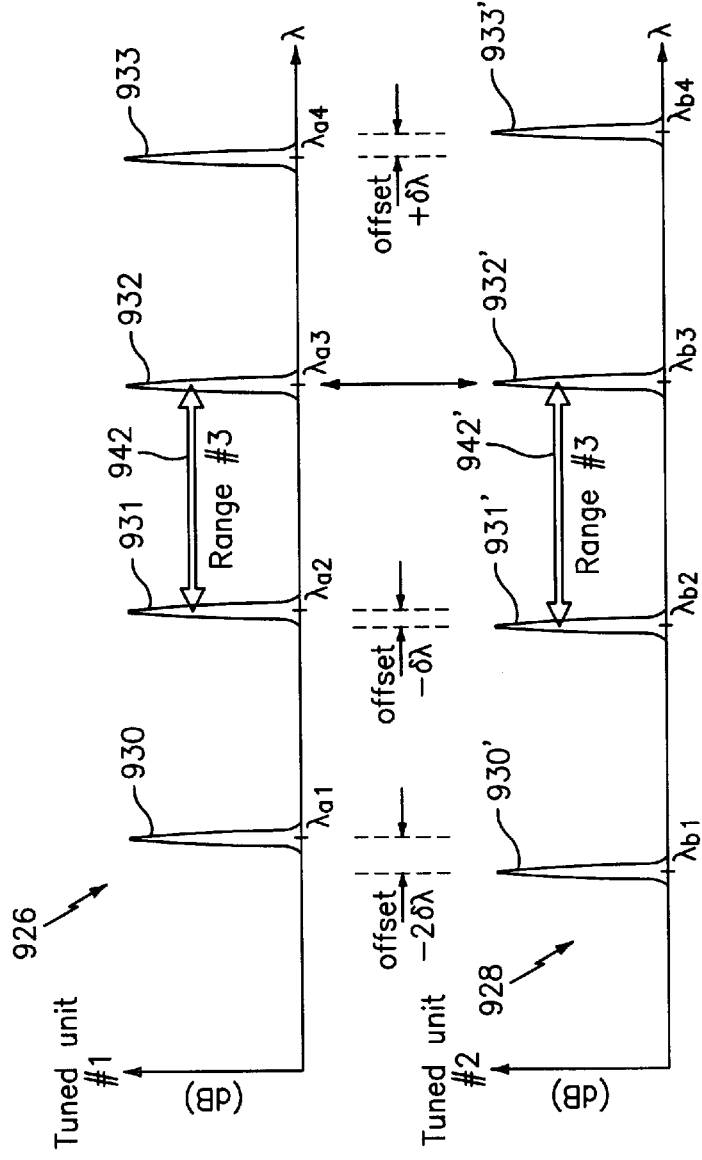

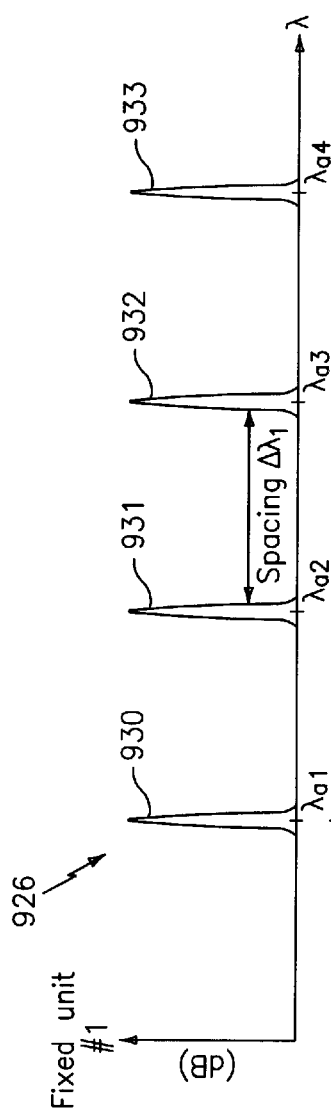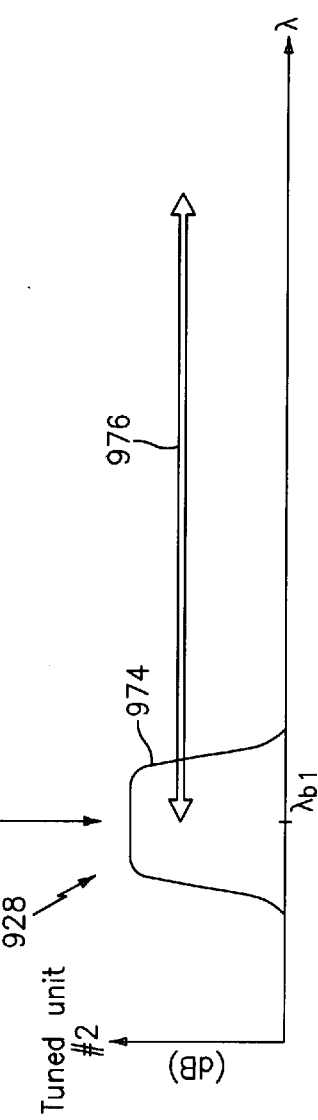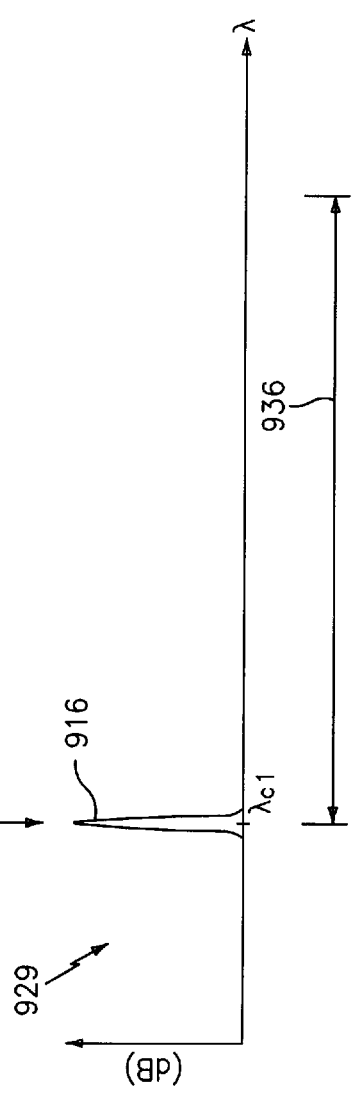

BRAGG GRATING-BASED LASER

CROSS REFERENCES TO RELATED APPLICATIONS

This is a continuation-in-part of U.S. patent application, Ser. No. 09/707,084 filed Nov. 6, 2000; which is a continuation-in-part of U.S. patent application Ser. No. 09/691,997 filed on Oct. 19, 2000, now U.S. Pat. No. 6,363,089; which is continuation of U.S. patent application Ser. No. 09/456,112 filed Dec. 6, 1999, now U.S. Pat. No. 6,229,827; which is a continuation-in-part of U.S. patent application Ser. No. 09/400,362 filed Sep. 20, 1999, now abandoned, which is a continuation-in-part of U.S. patent application Ser. No. 09/205,846, filed Dec. 4, 1998, now abandoned; all of which are incorporated herein by reference in their entirety.

Also, copending U.S. patent applications, Ser. No. 09/455,867 entitled "Bragg Grating Pressure Sensor", Ser. No. 09/455,865 entitled "Tube-Encased Fiber Grating", and Ser. No. 09/455,868 entitled "Large Diameter Optical Waveguide, Grating and Laser" all filed Dec. 6, 1999, and U.S. patent applications, Ser. No. 09/705,326 entitled "Tunable External Cavity Semiconductor Laser Incorporating a Tunable Bragg Grating" filed Nov. 3, 2000; and U.S. patent application Ser. No. 09/699,940 entitled "Temperature Compensated Optical Device" filed Oct. 30, 2000 contains subject matter related to that disclosed herein, and which are incorporated by reference in their entirety.

TECHNICAL FIELD

This invention relates to tunable lasers, and more particularly to a compression-tuned Bragg grating-based laser.

BACKGROUND ART

It is known in the art of fiber optics that Bragg gratings embedded in the fiber may be used in compression to act as a tunable filter or tunable fiber laser, as is described in U.S. Pat. No. 5,469,520, entitled "Compression Tuned Fiber Grating" to Morey, et al and U.S. Pat. No. 5,691,999, entitled "Compression Tuned Fiber Laser" to Ball et al.

To avoid fiber buckling under compression, the technique described in the aforementioned U.S. Pat. Nos. 5,469,520 and 5,691,999 uses sliding ferrules around the fiber and grating and places the ferrules in a mechanical structure to guide, align and confine the ferrules and the fiber. However, it would be desirable to obtain a configuration that allows a fiber grating to be compressed without buckling and without sliding ferrules and without requiring such a mechanical structure.

Also, it is known to attach an optical fiber grating to within a glass tube to avoid buckling under compression for providing a wavelength-stable temperature compensated fiber Bragg grating as is described in U.S. Pat. No. 5,042,898, entitled "Incorporated Bragg Filter Temperature Compensated Optical Waveguide Device", to Morey et al. However, such a technique exhibits creep between the fiber and the tube over time, or at high temperatures, or over large compression ranges.

The very narrow line width (<10 kHz) of single mode fiber lasers will, depending on the application, be an advantage (low phase noise) or a disadvantage (high power and narrow line width causes stimulated Brillouin scattering and hence loss). In telecom this should not be a problem since the lasers will be modulated, creating side-bands and hence effectively broadening the spectrum and increasing the threshold for Brillouin scattering.

Several fiber lasers in series or in parallel can be pumped using one semiconductor pump laser reducing the cost per fiber laser. Alternatively, parallel fiber lasers can be pumped by several pumps through a series of cross-connected couplers to form a pump redundancy scheme. With Er-lasers the pump absorption is very low and hence effectively broadening the spectrum and increasing the threshold for Brillion scattering.

Several fiber lasers in series or in parallel can be pumped using one semiconductor pump laser, reducing the cost per fiber laser. Alternatively, parallel fiber lasers can be pumped by several pumps through a series of cross-connected couplers to forma pump redundancy scheme. With Er-lasers the pump absorption is very low and hence the output power is low (~0.1 mW). This can be enhanced by a MOPA design using the residual pump power to pump an EDFA. Using Er:Yb and 980 nm pumping the pump absorption is greatly enhanced and the output power increased (~10 mW) [Kringlebotn et al., "Efficient Diode-Pumped Single-Frequency Erbium: Ytterbium Fiber Laser", IEEE Photonics Techn. Lett, Vol. 5, No. 10, pp 1162–1164 (October 1993); and J. T. Kringlebotn et al., "Highly-efficient, Low-noise Grating-feedback $Er^{3+}$:$TB^{3+}$ Codoped Fibre Laser", Eectr. Lettr., Vol. 30, No. 12, pp. 972–973, (June 1994), which are incorporated herein by reference in their entirety]. This high pump absorption can in some cases cause thermal effects resulting in mode-hopping and power saturation. Highly photosensitive Er:Yb fibers are harder to make than Er fibers.

Various tunable semiconductor lasers have been realized. DFB lasers have a limited temperature tenability (1–2 nm). Using sampled grating DBR cavities or combination of narrowband sampled grating filtering and broadband co directional filtering (using forward coupling between two parallel waveguides wide tuning ranges (−>40–100 nm) with relatively stable single mode operation can be realized (cf. Altitium laser). A problem with such designs is that they typically require 4 section cavities (gain, coupler, phase, reflector) with three individually/relatively controlled currents, making relatively complex and long lasers. Note that there are also various ways to make multi-wavelength/wavelength selective semiconductor laser arrays.

There are (at least) three possible FBG based single mode tunable fiber laser configurations: I) DFB, ii) DBR, and iii) sampled DBR.

DFB lasers using one phase-shifted FBG co-located with the gain medium should offer the best performance in terms of robust single mode operation, but require a highly photosensitive, high gain fiber, either Er or Er:Yb, and a relatively sophisticated FBG writing setup. DFB lasers should be able to provide the shortest grating based lasers. DBR lasers consisting of two FBG end-reflectors can be easier to realize, since separate gain fibers and grating fibers can be used (this requires low loss splicing), and the grating specs are relaxed. Mode-hopping can be a problem with DBR lasers.

Both DFB and DBR fiber lasers are continuously tunable through uniform strain of the whole cavity, including the gratings, in which case the cavity mode(s) and the Bragg wavelength are tuned equally [G. Ball and W. W. Morey, Opt. Lett., Vol. 17, pp. 420–422]. A practical tuning range in the order of 10 nm should be feasible. Both DFB and DBR fiber lasers can be designed to operate in a single polarization.

A sample grating DBR uses two sampled grating end-reflectors with comb-like reflection spectra over a wide wavelength range, and where the two gratings have different comb period. Using the Vernier effect this provides wide step-wise tuning with less compression/strain than required than for DFB/DBR lasers to get the same tuning range (a reduction by a factor of 10 probably have to be quite long (several cm) to get sufficiently strong reflection from each peak.

A fiber laser can be designed to achieve single longitudinal mode lasing, as is discussed in U.S. Pat. No. 5,305,335, entitled "Single Longitudinal Mode Pumped Optical Waveguide laser Arrangement", U.S. Pat. No. 5,317,576, entitled "Continuously Tunable Single-Mode Rare-Earth Doped Pumped Laser Arrangement", and U.S. Pat. No. 5,237,576, entitled "Article Comprising an Optical Fiber Laser", which are incorporated herein by reference in their entirety.

A general fiber laser and amplifier arrangement similar to a Master Oscillator Power Amplifier (MOPA) arrangement is described in U.S. Pat. No. 5,594,747 entitled "Dual-Wavelength Pumped Low Noise Fiber Laser", and U.S. Pat. No. 5,666,372 entitled "Embedded Bragg Grating Laser Master-Oscillator And Power-Amplifier", which are incorporated herein by reference.

SUMMARY OF THE INVENTION

Objects of the present invention include a tunable Bragg grating-based laser that allows the grating to be compression-tuned without creep and without requiring sliding ferrules or a mechanical supporting structure for the ferrules. The laser includes at least one grating element having a large transverse dimension that advantageously provides ease of manufacturability and handling as well as provides a waveguide much less sensitive to strain and environmental changes (e.g. bending and thermal changes).

According to the present invention, a compression-tuned laser comprises a first optical waveguide. At least a portion of which has a transverse cross-section, which is continuous and comprises a substantially homogeneous material. The at least portion of the first optical waveguide has an outer transverse dimension of at least 0.3 mm. The first optical waveguide includes an inner core disposed along the longitudinal axis of the first optical waveguide, and a first grating disposed within the core along the longitudinal axis. The grating reflects a first reflection wavelength of light. A second optical waveguide includes an inner core disposed along the longitudinal axis of the second optical waveguide, and a second grating disposed within the core along the longitudinal axis. An optical fiber includes a gain material that is optically disposed between the first and second optical waveguide. At least the first optical waveguide is axially compressed to change the first reflection wavelength reflected by the first grating.

According further to the present invention, a compression-tuned laser comprises a tunable optical waveguide, wherein at least a portion of which has a transverse cross-section, which is continuous and comprises a substantially homogeneous material. The at least portion of the optical waveguide has an outer transverse dimension of at least 0.3 mm. The optical waveguide includes an inner core disposed along the longitudinal axis of the optical waveguide. The inner core includes a dopant to provide an optical gain. The optical waveguide further includes a first grating and a second grating disposed within the inner core along the longitudinal axis. The first and second gratings are spaced a distance apart, the second grating having a plurality of gratings, each of which having a respective filter function spaced spectrally. The outer transverse dimension of the optical waveguide about the first grating is different than the outer transverse dimension of the optical waveguide about the second grating.

According further to the present invention, an optical laser comprises an optical waveguide, wherein at least a portion of which has a transverse cross-section, which is continuous and comprises a substantially homogeneous material. The at least portion of the optical waveguide has an outer transverse dimension of at least 0.3 mm. The optical waveguide includes a pair of inner cores disposed along the longitudinal axis of the optical waveguide. The inner cores are spaced to minimize optical coupling therebetween. A first grating is disposed within one core along the longitudinal axis, and a second grating is disposed within the other core along the longitudinal axis. A gain element is optically disposed between the pair of inner cores.

According further to the present invention, an optical laser comprises a first optical waveguide, wherein at least a portion of which has a transverse cross-section, which is continuous and comprises a substantially homogeneous material. The at least portion of the first optical waveguide has an outer transverse dimension of at least 0.3 mm. The first optical waveguide includes an inner core disposed along the longitudinal axis of the first optical waveguide, and a first grating disposed within the core along the longitudinal axis. A reflective element reflects light at a desired wavelength band. An optical fiber includes an optical gain material, wherein the fiber is optically disposed between the first optical waveguide and reflective element. At least the first optical waveguide is axially compressed to change the first reflection wavelength reflected by the first grating.

BRIEF DESCRIPTION OF THE DRAWINGS

FIG. 4 is a side view of a tube-encased fiber grating, in accordance with the present invention.

FIG. 5 is a side view of a tube-encased fiber grating having an alternative geometry for the tube, in accordance with the present invention.

FIGS. 25A–25C are graphical representations of the filter functions of the grating elements and the output signal of the tunable laser of FIG. 24;

FIGS. 26–26C are graphical representations of the filter functions of the grating elements and the output signal of another embodiment of the tunable laser of FIG. 24;

FIGS. 30A–30C are graphical representations of the filter functions of the grating elements and the output signal of the tunable laser of FIG. 28;

FIGS. 33–33C are graphical representations of the filter functions of the grating elements and the output signal of the tunable laser of FIG. 32;

BEST MODE FOR CARRYING OUT THE INVENTION

Figure 1:
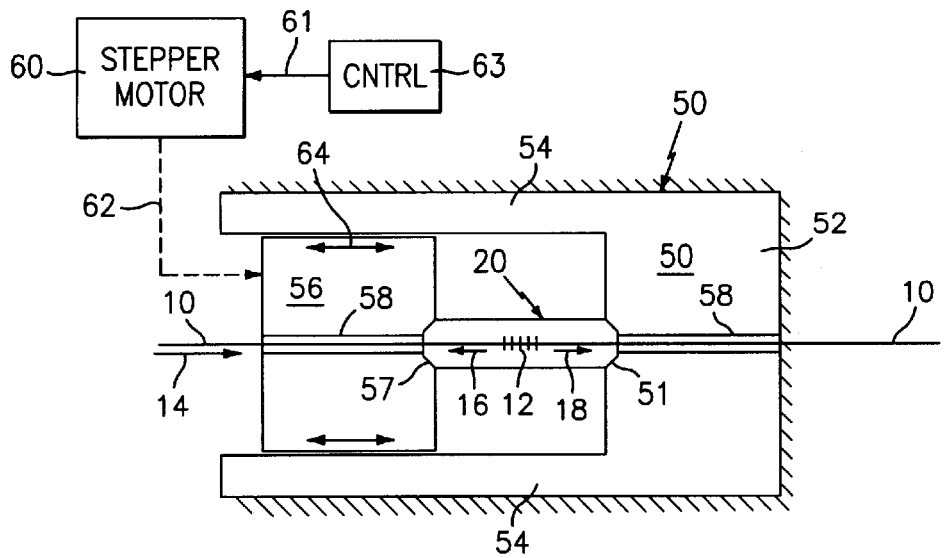
FIG. 1 is a side view of a device for compressing a tube-encased fiber grating, in accordance with the present invention.

Referring to FIG. 1, a compression-tuned Bragg grating comprises a known optical waveguide 10, e.g., a standard telecommunication single mode optical fiber, having a Bragg grating 12 impressed (or embedded or imprinted) in the fiber 10. The fiber 10 has an outer diameter of about 125 microns and comprises silica glass (SiO$_2$) having the appropriate dopants, as is known, to allow light 14 to propagate along the fiber 10. The Bragg grating 12, as is known, is a periodic or aperiodic variation in the effective refractive index and/or effective optical absorption coefficient of an optical waveguide. However, any wavelength-tunable grating or reflective element embedded, etched, imprinted, or otherwise formed in the fiber 28 may be used if desired. As used herein, the term "grating" means any of such reflective elements. Further, the reflective element (or grating) 12 may be used in reflection and/or transmission of light.

Other materials and dimensions for the optical fiber or waveguide 10 may be used if desired. For example, the fiber 10 may be made of any glass, e.g., silica, phosphate glass, or other glasses, or made of glass and plastic, or solely plastic. For high temperature applications, optical fiber made of a glass material is desirable. Also, the fiber 10 may have an outer diameter of 80 microns or other diameters. Further, instead of an optical fiber, any optical waveguide may be used, such as, a multi-mode, birefringent, polarization maintaining, polarizing, multi-core, or multi-cladding optical waveguide, or a flat or planar waveguide (where the waveguide is rectangular shaped), or other waveguides.

The light 14 is incident on the grating 12 which reflects a portion thereof as indicated by a line 16 having a predetermined wavelength band of light centered at a reflection wavelength $\lambda b$, and passes the remaining wavelengths of the incident light 14 (within a predetermined wavelength range), as indicated by a line 18.

The fiber 10 with the grating 12 therein is encased within and fused to at least a portion of a cylindrical glass capillary tube 20, discussed more hereinafter. The tube 20 is axially compressed by a compressing device or housing 50. One end of the tube 20 is pressed against a seat 51 in an end 52 of the housing 50. The housing 50 also has a pair of arms (or sides) 54, which guide a movable block 56. The block 56 has a seat 57 that presses against the other end of the tube 20. The end 52 and the block 56 have a hole 58 drilled through them to allow the fiber 10 to pass through. An actuator 60, such as a stepper motor or other type of motor whose rotation or position can be controlled, is connected by a mechanical linkage 62, e.g., a screw drive, linear actuator, gears, and/or a cam, to the movable block 56 (or piston) which causes the block 56 to move as indicated by arrows 64. Accordingly, the stepper motor 60 can set a predetermined amount of force on the block to compress the tube 20 to provide a desired reflection wavelength of the grating 12. Instead of the recessed seats 51,57, the tube 20 may contact the ends 52,56 with a flush contact. The stepper motor 60 may be a high resolution stepper motor driven in a microstepping mode. Other higher or lower resolution stepper motors may be used if desired. The stepper motor 60 is driven by a control circuit 63 which provides drive signals on lines 61 needed to drive the stepper motor 60, and hence the block 56, to the desired position, to provide the desired Bragg wavelength λb of the grating 12. Instead of a stepper motor, other actuators may be used if desired, as discussed hereinafter with FIG. 14.

Figure 2:
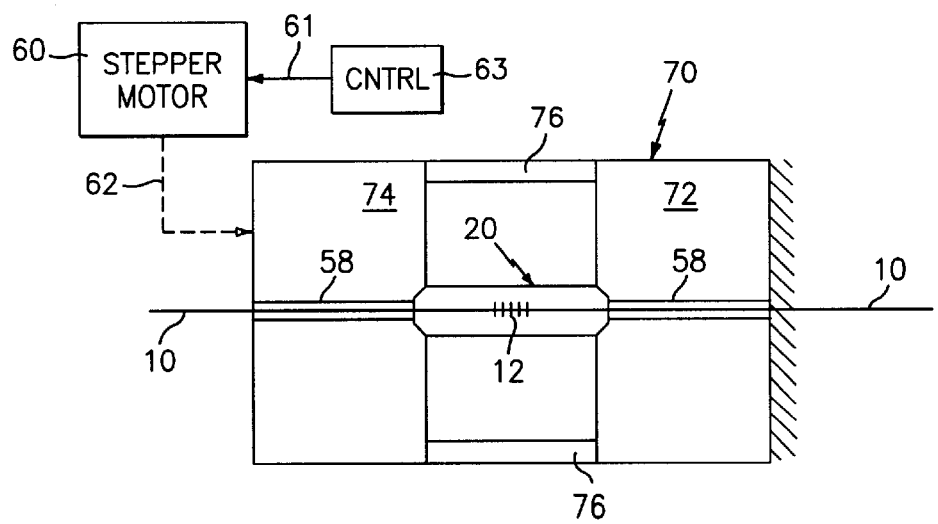
FIG. 2 is a side view of an alternative device for compressing a tube-encased fiber grating, in accordance with the present invention.

Referring to FIG. 2, instead of using the movable block 56, a housing 70 may be used which has two end caps 72,74 and outside walls 76. In that case, the holes 58 are in the end caps 72,74 to allow the fiber 10 to exit. The stepper motor 62 is connected to the end cap 74 by the mechanical linkage 62. When the stepper motor 62 pushes on the end cap 74, the walls 76 compress or deflect, the tube 20 is compressed and the reflection wavelength of the grating 12 shifts.

Figure 3:
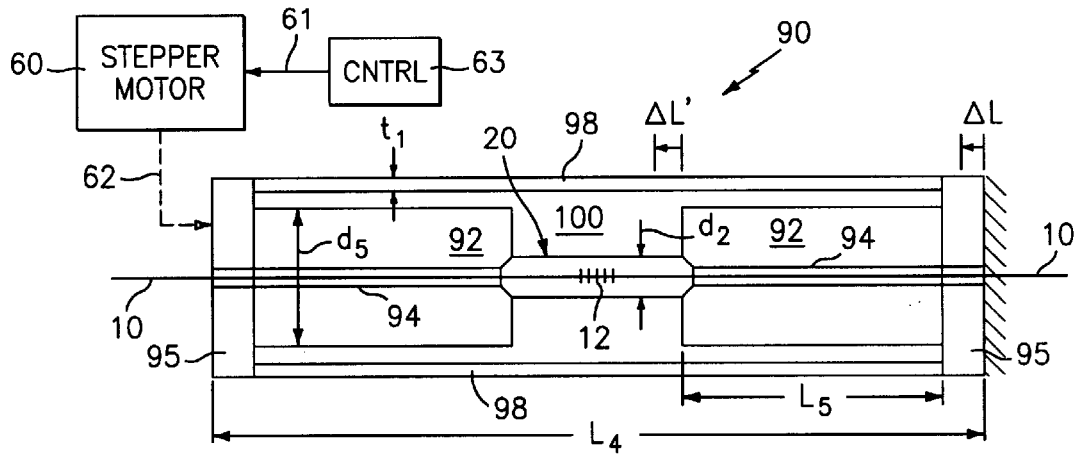
FIG. 3 is a side view of an alternative device for compressing a tube-encased fiber grating, in accordance with the present invention.

Referring to FIG. 3, another embodiment of the present invention, comprises a cylindrical-shaped housing 90 comprising an outer cylindrical wall 98, two end caps 95, and two inner cylinders (or pistons) 92 each connected at one end to one of the end caps 95. The tube 20 (with the grating 12 encased therein) is disposed against the other ends of and between the two pistons 92. Other cross-sectional and/or side-view sectional shapes may be used for the housing 90 elements 98,95,92 if desired. The end caps 95 may be separate pieces or part of and contiguous with the pistons 92 and/or the outer cylinder 98.

The stepper motor 60 applies an external axial force on the end cap 95 on the left side of the housing 90. The pistons 92 have holes 94 having a diameter large enough to allow the fiber 10 pass through.

Between the inside dimension of the walls 98 and the outside dimension of tube 20 and pistons 92 is an inner I-shaped chamber 100. The pistons 92, the outer cylinder walls 98, the end caps 95, and the tube 20 may be made of the same or different materials.

An example of some possible dimensions for the housing 90 are as follows. Other dimensions may be used. The tube 20 has the outer diameter d2 of about 2 mm (0.07 inches) and a length L1 of about 12.5 mm (0.5 in.), the pistons 92 each have outer diameters d5 of about 19.1 mm (0.75 inches), the length L5 of each of the pistons 92 is about 6.25 cm (2.5 in.), the diameter of the holes 94 in the pistons 92 is about 1 mm (1000 microns), the overall length L4 of the housing 90 is about 12.7 cm (5 inches), the thickness t1 of the outside walls 98 is about 1.0 mm (0.04 inches), and the gap g1 between the inner dimension of the outer walls 98 and the outer dimensions of the pistons 92 is about 1.52 mm (0.06 inches).

The dimensions, materials, and material properties (e.g., Poisson's ratio, Young's Modulus, Coefficient of Thermal Expansion, and other known properties), of the walls 98 and the pistons 92 are selected such that the desired strain is delivered to the capillary tube 20 at an external force. The resolution and range for setting the reflection wavelength are scalable by controlling these parameters. For example, if the overall length L4 is increased, the sensitivity ΔL/L will increase.

In particular, as the axial force from the stepper motor increases, the axial length L4 of the housing 90 decreases by an amount ΔL due to compression and/or deflection of the outer walls 98. A predetermined portion of the total axial length change ΔL' is seen at the tube 20 due to compression of the tube 20. Compression of the tube 20 lowers the Bragg reflection wavelength λ1 of the grating 12 by a predetermined amount which provides a wavelength shift. If the pistons 92 have a spring constant higher than that of the glass tube 20, the tube 20 will be compressed more than the pistons 92 for a given force. Also, for a given external force, a predetermined amount of the force is dropped across the outside walls 98, and the remainder is seen by the tube 20.

For example, when the walls 98, pistons 92 and end caps 95 are all made of titanium having the dimensions discussed hereinbefore, for an external force of 2200 lbf, about 2000 lbf is dropped across (or used to compress/deflect) the outside walls 98, and about 200 lbf is dropped across the tube 20. The cylinder walls 98 act similar to a diaphragm or bellows which compress or deflect due to increased external pressure.

The housing 90 may be assembled such that a pre-strain or no pre-stain exists on the tube 20 prior to applying any outside forces.

The material of the housings 50,70, 90 and/or one or more of the components thereof, may be made of a metal such as titanium, high nickel content alloys such as Inconel®, Incoloy®, Nimonic® (registered trademarks of Inco Alloys International, Inc.) containing various levels of Nickel, Carbon, Chromium, Iron, Molybdenum, and Titanium, stainless steel, a glass material (such as discussed hereinafter for the tube 20), or other high strength, or corrosion resistant, or high temperature or heat resistant metals or alloys may be used, or other materials having sufficient strength to compress the tube 20 may be used. Other materials having other properties may be used if desired depending on the application.

Figure 14:
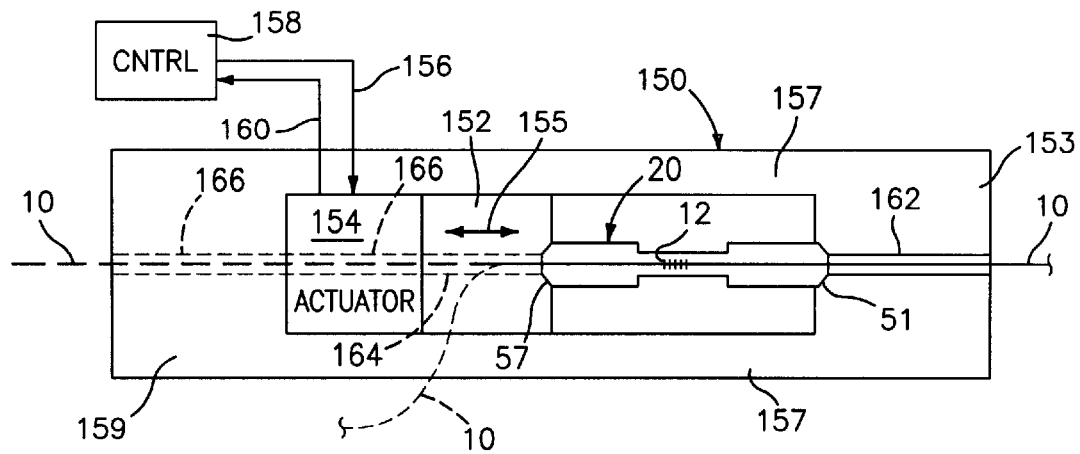
FIG. 14 is a side view of a device for compressing a tube-encased fiber grating using an actuator to tune the grating, in accordance with the present invention.

Referring to FIG. 14, alternatively, instead of using a stepper motor as the actuator, the tube 20 may be compressed by another actuator 154, such as a peizoelectric actuator, solenoid, pneumatic force actuator, or any other device which is capable of directly or indirectly applying an axial compressive force on the tube 20 may be used. The actuator 154 may be disposed on a housing 150 (analogous to the frame 50; FIG. 1) and creates a force on a movable block 152 (analogous to the movable block 56; FIG. 1) which moves in the direction of the arrows 155.

One end of the tube 20 is pressed against the seat 51 in an end 153 of the housing 150. The housing 150 also has a pair of sides 157 which guide the movable block 152. One of the sides 157 may be removed if desired. The block 152 has the seat 57 that presses against the other end of the tube 20.

Also, the actuator 154 is connected to a control circuit 158 which provides the necessary signals on a line 156 to the actuator 154 to set the desired force on the tube 20 which sets the desired Bragg wavelength λb of the grating 12. The force may be set by the controller 158 by providing a signal (e.g., an electrical voltage) on the line 156 to the actuator 154 in an open loop configuration. Alternatively, the force may be set on the actuator 154 by providing a signal on the line 156 to the actuator 154 and measuring the force or position of the actuator 154 on a line 160 in a closed loop control configuration on the actuator 154.

For single ended operation, the fiber 10 may enter on one end of the housing 150 and pass through a hole 162 in the end 153. If a feed-through (double ended fiber) design is used, the block 152 may have a hole 164 part or all the way through it, and the other end of the fiber 10 may be fed out the side or passed through a hole 166 in the actuator 154 and in the other end of the housing 150.

One example of a closed loop piezoelectric actuator that may be used is Model No. CM (controller) and DPT-C-M (for a cylindrical actuator) made by Queensgate, Inc. of N.Y. Other actuators may be used, as discussed hereinbefore.

Figure 15:
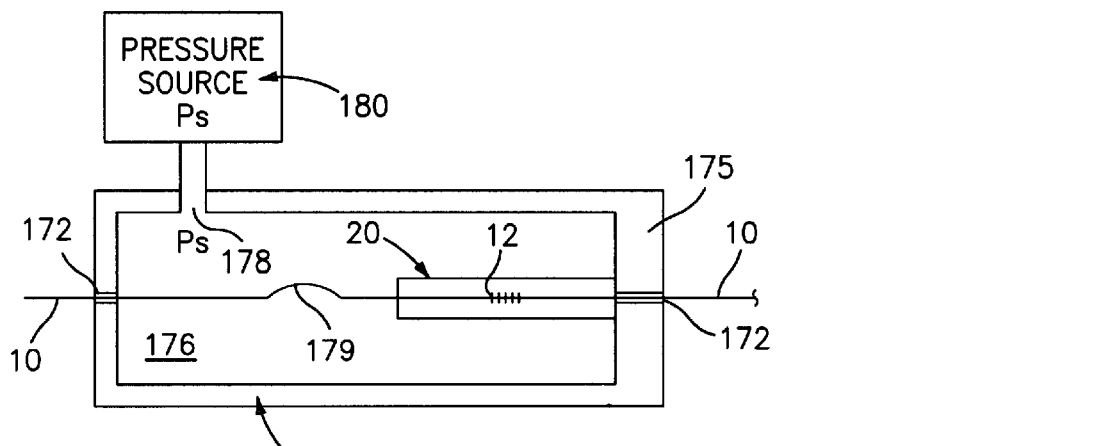
FIG. 15 is a side view of a device for compressing a tube-encased fiber grating using a precise pressure source to tune the grating, in accordance with the present invention.

Referring to FIG. 15, alternatively, the tube 20 may be placed in a housing 174, and the grating wavelength set by placing a fluid pressure on the tube 20, similar to a pressure sensor described in co-pending U.S. patent application, Ser. No. 09/205,944 entitled "Tube-Encased Fiber Grating Pressure Sensor", filed Dec. 4, 1998, which is incorporated herein by reference, and the tube 20 may have any of the geometries and configurations described in such Patent Application. The housing 172 creates a chamber 176 and has a port 178 that is fed to a pressure source 180, which provides a precise source pressure Ps. The chamber 176 may be filled with a fluid (e.g., one or more gasses and/or liquids). The tube 20 may be mounted to one wall 175 or may be suspended in the fluid 176. The optical fiber 10 is fed into the chamber through a known hermetic feedthroughs and has some slack 179 to allow for compression of the tube 20 over pressure. The grating reflection wavelength changes as the pressure Ps changes, similar to the actuator embodiments discussed hereinbefore; however, in this case, the grating wavelength is set by setting a predetermined source fluid pressure Ps.

Figure 16:
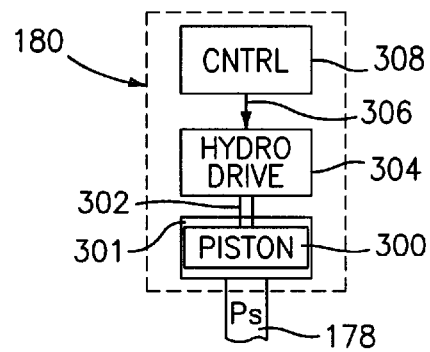
FIG. 16 is a side view of a device for compressing a tube-encased fiber grating using a precise pressure source to tune the grating, in accordance with the present invention.

Referring to FIG. 16, for example, the pressure source 180 may comprise a hydraulic actuator or piston 300 disposed within a chamber 301. The piston 300 is connected by a mechanical linkage 302 to a known hydraulic drive mechanism 304 which precisely sets the position of the piston 300 to set the pressure Ps. The hydraulic drive 304 may be controlled electronically by a known control circuit 308, similar to the controller 158 (FIG. 14), which provides a position command signal on a line 306 to the hydraulic controller 304 for a particular piston position and thus pressure Ps, and thus wavelength λb of the grating. Other known pressure sources may be used if desired to set the grating wavelength. The housings described herein 50,150, 70,90, and any components therein, including the movable blocks 56,152, may have a circular cross-section (i.e., cylindrical shape) or may have other cross-sectional shapes, such as square, rectangular, or other shapes.

Although the invention has been described with some specific embodiments with FIGS. 1–3,14,15 for compressing the tube 20, any device or fixture, which compresses the tube axially may be used for compressing the tube 20 to tune the reflection wavelength of the grating 12 to the desired wavelengths. The exact hardware configuration is not critical to the present invention.

For any of the embodiments described herein, the axial end faces of the tube 20 and/or the seats on mating surfaces (56,50,92,74,72,153,159) may be plated with a material that reduces stresses or enhances the mating of the tube 20 with the seat on the mating surfaces. Referring to FIG. 4, the tube 20 may have an outer diameter d1 of about 3 mm and a length L1 of about 10–30 mm. The grating 12 has a length Lg of about 5–15 mm. Alternatively, the length L1 of the tube 20 may be substantially the same length as the length Lg of the grating 12, such as by the use of a longer grating, or a shorter tube. Other dimensions and lengths for the tube 20 and the grating 12 may be used. Also, the fiber 10 and grating 12 need not be fused in the center of the tube 20 but may be fused anywhere in the tube 20. Also, the tube 20 need not be fused to the fiber 10 over the entire length of the tube 20.

The dimensions and geometries for any of the embodiments described herein are merely for illustrative purposes and, as such, any other dimensions may be used if desired, depending on the application, size, performance, manufacturing requirements, or other factors, in view of the teachings here in.

The tube 20 is made of a glass material, such as natural or synthetic quartz, fused silica, silica ($SiO_2$), Pyrex® by Corning (boro silicate), or Vycor® by Corning Inc. (about 95% silica and 5% other constituents such as Boron Oxide), or other glasses. The tube should be made of a material such that the tube 20 (or the inner diameter surface of a bore hole in the tube 20) can be fused to (i.e., create a molecular bond with, or melt together with) the outer surface (or cladding) of the optical fiber 10 such that the interface surface between the inner diameter of the tube 20 and the outer diameter of the fiber 10 become substantially eliminated (i.e., the inner diameter of the tube 20 cannot be distinguished from and becomes part of the cladding of the fiber 10).

For best thermal expansion matching of the tube 20 to the fiber 10 over a large temperature range, the coefficient of thermal expansion (CTE) of the material of the tube 20 should substantially match the CTE of the material of the fiber 10, e.g., fused silica tube and optical fiber. In general, the lower the melting temperature of the glass material, the higher the CTE. Thus, for a silica fiber (having a high melting temperature and low CTE) and a tube made of another glass material, such as Pyrex® or Vycor® (having a lower melting temperature and higher CTE) results in a thermal expansion mismatch between the tube 20 and the fiber 10 over temperature. However, it is not required for the present invention that the CTE of the fiber 10 match the CTE of the tube 20 (discussed more hereinafter).

Instead of the tube 20 being made of a glass material, other elastically deformable materials may be used provided the tube 20 can be fused to the fiber 10. For example, for an optical fiber made of plastic, a tube made of a plastic material may be used.

The axial ends of the tube 20 where the fiber 10 exits the tube 20 may have an inner region 22, which is inwardly tapered (or flared) away from the fiber 10 to provide strain relief for the fiber 10 or for other reasons. In that case, an area 28 between the tube 20 and the fiber 10 may be filled with a strain relief filler material, e.g., polyimide, silicone, or other materials. Also, the tube 20 may have tapered (or beveled or angled) outer corners or edges 24 to provide a seat for the tube 20 to mate with another part (not shown) and/or to adjust the force angles on the tube 20, or for other reasons. The angle of the beveled corners 24 is set to achieve the desired function. The tube 20 may have cross-sectional shapes other than circular, such as square, rectangular, elliptical, clam-shell, or other shapes, and may have side-view sectional shapes other than rectangular, such as circular, square, elliptical, clam-shell, or other shapes.

Alternatively, instead of having the inner tapered axial region 22, one or both of the axial ends of the tube 20 where the fiber 10 exits the tube 20 may have an outer tapered (or fluted, conical, or nipple) axial section, shown as dashed lines 27, which has an outer geometry that decreases down to the fiber 10 (discussed more hereinafter with FIG. 12). We have found that using the fluted sections 27 provides enhanced pull strength at and near the interface where the fiber 10 exits the tube 20, e.g., 6 lbf or more, when the fiber 10 is pulled along its longitudinal axis.

Where the fiber 10 exits the tube 20, the fiber 10 may have an external protective buffer layer 21 to protect the outer surface of the fiber 10 from damage. The buffer 21 may be made of polyimide, silicone, Teflon® (polytetraflouroethylene), carbon, gold, and/or nickel, and have a thickness of about 25 microns. Other thicknesses and buffer materials for the buffer layer 21 may be used. If the inner tapered region 22 is used and is large enough, the buffer layer 21 may be inserted into the region 22 to provide a transition from the bare fiber to a buffered fiber. Alternatively, if the axial end of the tube 20 has the external taper 27, the buffer 21 would begin where the fiber exits the tapered 27 portion of the tube 20. If the buffer 21 starts after the fiber exit point, the exposed bare portion of the fiber 10 may be recoated with an additional buffer layer (not shown) which covers any bare fiber outside of the tube 20 and may also overlap with the buffer 21 and/or some of the tapered region 27 or other geometrically shaped axial end of the tube 20.

To encase the fiber 10 within the tube 20, the tube 20 may be heated, collapsed, and fused to the grating 12, by a laser, filament, flame, etc., as is described in copending U.S. patent application, Ser. No. 09/399,495, entitled "Tube-Encased Fiber Grating", which is incorporated herein by reference. Other techniques may be used for collapsing and fusing the tubes 20 to the fiber 10, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber 10 to the tube 20, such as using a high temperature glass solder, e.g., a silica solder (powder or solid), such that the fiber 10, the tube 20 and the solder all become fused to each other, or using laser welding/fusing or other fusing techniques. Also, the fiber may be fused within the tube or partially within or on the outer surface of the tube (discussed hereinafter with FIG. 11).

The Bragg grating 12 may be impressed in the fiber 10 before or after the capillary tube 20 is encased around and fused to the fiber 10, such as is discussed in copending U.S. patent application, Ser. No. 09/205,943, which is incorporated herein by reference. If the grating 12 is impressed in the fiber 10 after the tube 20 is encased around the grating 12, the grating 12 may be written through the tube 20 into the fiber 10 by any desired technique, such as is described in copending U.S. patent application, Ser. No. 09/205,845, entitled "Method and Apparatus For Forming A Tube-Encased Bragg Grating", filed Dec. 4, 1998.

The grating 12 may be encased in the tube 20 having an initial pre-strain from the tube (compression or tension) or no pre-strain. For example, if Pyrex® or another glass that has a larger coefficient of thermal expansion (CTE) than that of the fiber 10 is used for the tube 20, when the tube 20 is heated and fused to the fiber and then cooled, the grating 12 is put in compression by the tube 20. Alternatively, the fiber grating 12 may be encased in the tube 20 in tension by putting the grating in tension during the tube heating and fusing process. In that case, when the tube 20 is compressed, the tension on the grating 12 is reduced. Also, the fiber grating 12 may be encased in the tube 20 resulting in neither tension nor compression on the grating 12 when no external forces are applied to the tube 20.

Referring to FIG. 5, the capillary tube 20 may have a varying geometry, depending on the application. For example, the tube 20 may have a "dogbone" shape having a narrow central section 30 and larger outer sections 32. The narrow section 30 has an outer diameter d2 of about 1 mm, and a length L2 of about 5 mm. The large sections 32 each have a diameter d3 of about 3 mm and a length L3 of about 4 mm. Other lengths and diameters of the sections 30,32 may be used. The dogbone shape may be used to provide increased sensitivity in converting force applied by the stepper motor 60 or actuator 154 to wavelength shift of the tube-encased grating 12.

An inner transition region 33 of the large sections 32 may be a sharp vertical or angled edge or may be curved as indicated by dashed lines 34. A curved geometry 34 has less stress risers than a sharp edge and thus may reduce the likelihood of breakage. Also, the sections 32 of the tube 20 may have the inner tapered regions 22 or the outer fluted sections 27 at the ends of the tube 20, as discussed hereinbefore. Further, the sections 32 may have the tapered (or beveled) outer corners 24 as discussed hereinbefore.

Also, it is not required that the dogbone geometry be symmetric, e.g., the lengths L3 of the two sections 32 may be different if desired. Alternatively, the dogbone may be a single-sided dogbone, where instead of the having the two larger sections 32, there may be only large section 32 on one side of the narrow section 30 and the other side may have a straight edge 37 which may have beveled corners 24 as discussed hereinbefore. In that case, the dogbone has the shape of a "T" on its side. Such a single-sided dogbone shall also be referred to herein as a "dogbone" shape. Instead of a dogbone geometry, other geometries that provide enhanced strain sensitivity or adjust force angles on the tube 20 or provide other desirable characteristics may be used.

We have found that such a dimension change between the dimension d3 of the large section 32 and the dimension d2 of the narrow section 30 provides increased force to grating wavelength shift sensitivity (or gain or scale factor) by strain amplification. Also, the dimensions provided herein for the dogbone are easily scalable to provide the desired amount of sensitivity.

Figure 6:
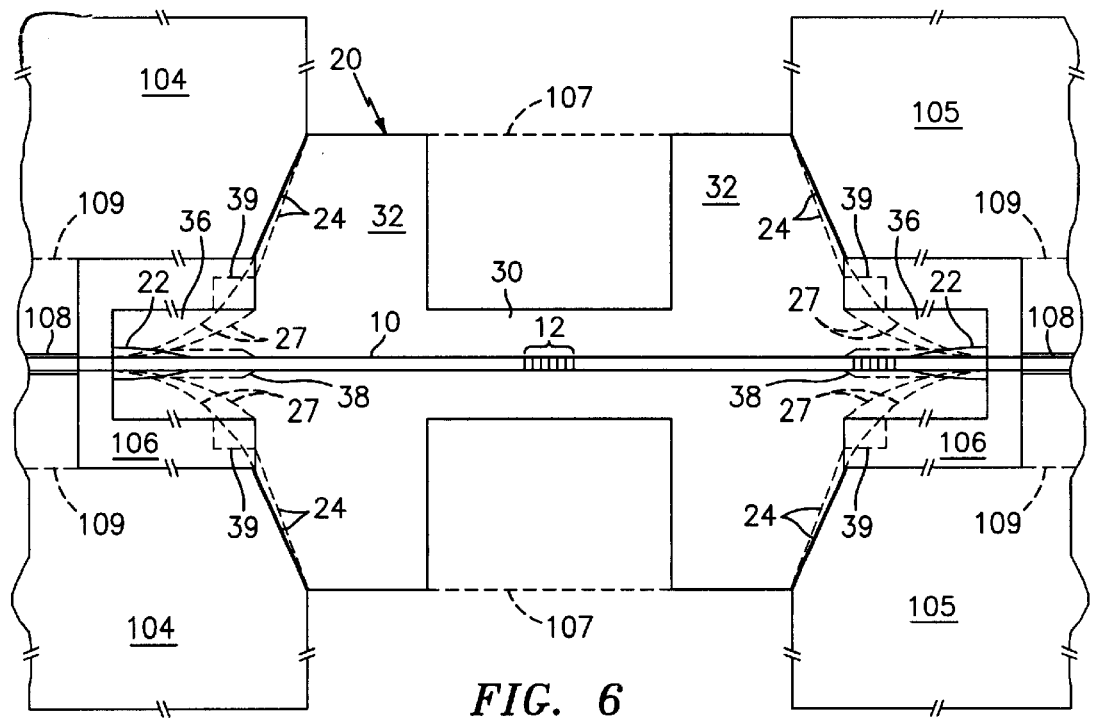
FIG. 6 is a side view of a tube-encased fiber grating having an alternative geometry for the tube, in accordance with the present invention.

Referring to FIG. 6, alternatively, to help reduce strain on the fiber 10 at the interface between the fiber 10 and the tube 20, the tube 20 may have sections 36 which extend axially along the fiber 10 and attach to the fiber 10 at a location that is axially outside where the force is applied on the large sections 32 by opposing end pieces 104,105, which are equivalent to the end pieces 56,50 (FIG. 1), 74,72 (FIG. 2), 159,153 (FIG. 14), respectively, or the pistons 92 (FIG. 3). The axial length of the sections 36 may be about 20 mm; however, longer or shorter lengths may be used depending on the application or design requirements. Also, the sections 36 need not be axially symmetrical, and need not be on both axial ends of the tube 20. The sections 32 may have the inner tapered regions 22 or the outer fluted sections 27 where the fiber interfaces with the tube 20, as discussed hereinbefore. Alternatively, there may be a stepped section 39 as part of the sections 36. In that case, the region 22 may be within or near to the stepped section 39 as indicated by dashed lines 38. The regions 106 may be air or filled with an adhesive or filler. Also, the tube 20 may have a straight constant cross-section as discussed hereinbefore and as indicated by the dashed lines 107 instead of a dogbone shape. Further, the hole 108 through the end pieces 56,50 (FIG. 1), 74,72 (FIG. 2), 152,150 (FIG. 14), respectively, or the pistons 92 (FIG. 3) may have a larger diameter as indicated by the dashed lines 109 for all or a portion of the length of the hole 108. The capillary tube 20 may have other axial extending geometries, such as is discussed in the aforementioned copending U.S. patent application, Ser. No. 09/455,865. Also, more than one concentric tube may be used to form the tube 20 of the present invention, as discussed in the aforementioned copending U.S. Patent Application. Also, the axially extended sections 36 may be part of an inner tube.

Figure 7:
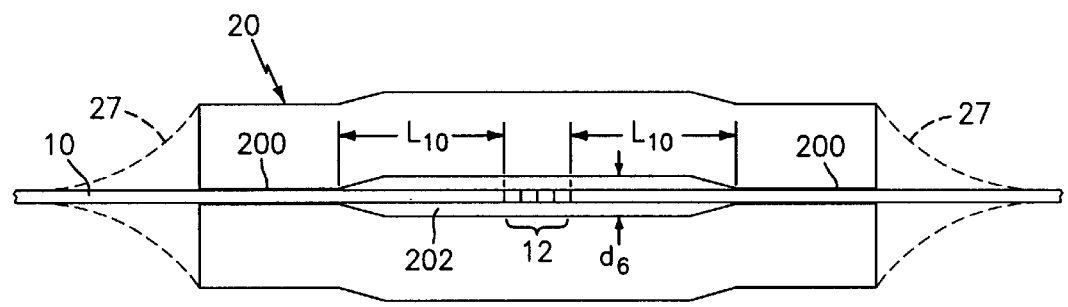
FIG. 7 is a side view of a tube-encased fiber grating where the tube is fused on opposite axial ends of the grating area, in accordance with the present invention.

Referring to FIG. 7, alternatively, the tube 20 may be fused to the fiber 10 on opposite sides of the grating 12. In particular, regions 200 of the tube 20 are fused to the fiber 10 and a central section 202 of the tube around the grating 12 is not fused to the fiber 10. The region 202 around the grating 12 may contain ambient air or be evacuated (or be at another pressure) or may be partially or totally filled with an adhesive, e.g., epoxy, or other filling material, e.g., a polymer or silicone, or another material or may be not filled. As discussed hereinbefore, the inner diameter d6 of the tube 20 is about 0.01 to 10 microns larger than the diameter of the optical fiber 10, e.g., 125.01 to 135 microns. Other diameters may be used; however, to help avoid fiber buckling in this embodiment, the diameter d6 should be as close as possible to outer diameter of the fiber 10. Alternatively, the same result can be achieved by fusing two separate tubes on opposite sides of the grating 12 and then fusing an outer tube across the tubes, as discussed in the aforementioned copending U.S. Patent Application.

Figure 8:
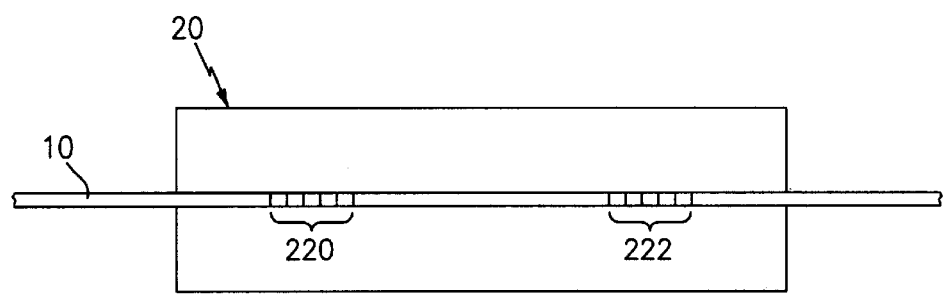
FIG. 8 is a side view of more than one grating on a fiber encased in a tube, in accordance with the present invention.

We have found that the present invention provides high repeatability, low creep and low hysteresis (e.g., about 3 picometers or less), depending on the configuration used. Referring to FIG. 8, for any of the embodiments described herein, instead of a single grating encased within the tube 20, two or more gratings 220,222 may be embedded in the fiber 10 that is encased in the tube 20. The gratings 220,222 may have the same reflection wavelengths and/or profiles or different wavelengths and/or profiles. The multiple gratings 220,222 may be used individually in a known Fabry Perot arrangement.

Further, one or more fiber lasers, such as that described in U.S. Pat. No. 5,666,372, "Compression-Tuned Fiber Laser" (which is incorporated herein by reference to the extent necessary to understand the present invention) may be embedded within the fiber 10 in the tube 20 and compression-tuned. In that case, the gratings 220,222 form a cavity and the fiber 10 at least between the gratings 220,222 (and may also include the gratings 220,222, and/or the fiber 10 outside the gratings, if desired) would be doped with a rare earth dopant, e.g., erbium and/or ytterbium, etc., and the lasing wavelength would be tuned accordingly as the force on the tube 20 changes.

Figure 13:
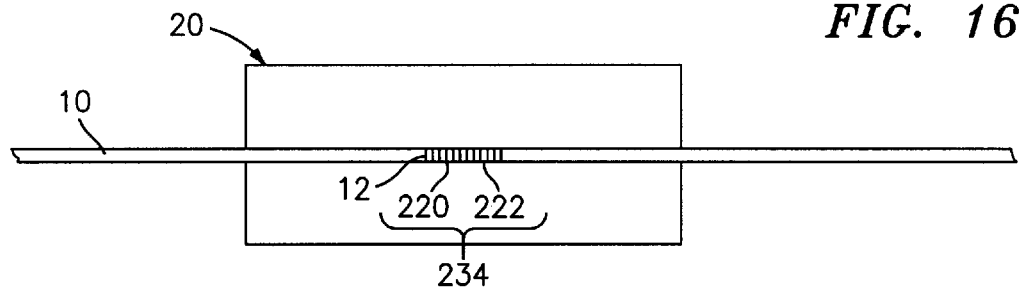
FIG. 13 is a side view of a tunable distributed feedback (DFB) fiber laser encased in a tube, in accordance with the present invention.

Referring to FIG. 13, another type of tunable fiber laser that may be used is a tunable distributed feedback (DFB) fiber laser 234, such as that described in V. C. Lauridsen, et al, "Design of DFB Fibre Lasers", Electronic Letters, Oct. 15, 1998, Vol.34, No. 21, pp 2028–2030; P. Varming, et al, "Erbium Doped Fiber DGB Laser With Permanent π/2 Phase-Shift Induced by UV Post-Processing", IOOC'95, Tech. Digest, Vol. 5, PD1–3, 1995; U.S. Pat. No. 5,771,251, "Optical Fibre Distributed Feedback Laser", to Kringlebotn et al; or U.S. Pat. No. 5,511,083, "Polarized Fiber Laser Source", to D'Amato et al., which are incorporated herein by reference in their entirety. In that case, the grating 12 is written in a rare-earth doped fiber and configured to have a phase shift of $\lambda/2$ (where $\lambda$ is the lasing wavelength) at a predetermined location 224 near the center of the grating 12 which provides a well defined resonance condition that may be continuously tuned in single longitudinal mode operation without mode hopping, as is known. Alternatively, instead of a single grating, the two gratings 220,222 may be placed close enough to form a cavity having a length of $(N+\frac{1}{2})\lambda$, where N is an integer (including 0) and the gratings 220,222 are in rare-earth doped fiber.

Alternatively, the DFB laser 234 may be located on the fiber 10 between the pair of gratings 220,222 (FIG. 8) where the fiber 10 is doped with a rare-earth dopant along at least a portion of the distance between the gratings 220,222. Such configuration is referred to as an "interactive fiber laser", as is described by J. J. Pan et al, "Interactive Fiber Lasers with Low Noise and Controlled Output Power", E-Tek Dynamics, Inc., San Jose, Calif., internet web site www.e-tek.com/products/whitepapers, which are incorporated by reference in their entirety. Other single or multiple fiber laser configurations may be disposed on the fiber 10 if desired.

Figure 9:
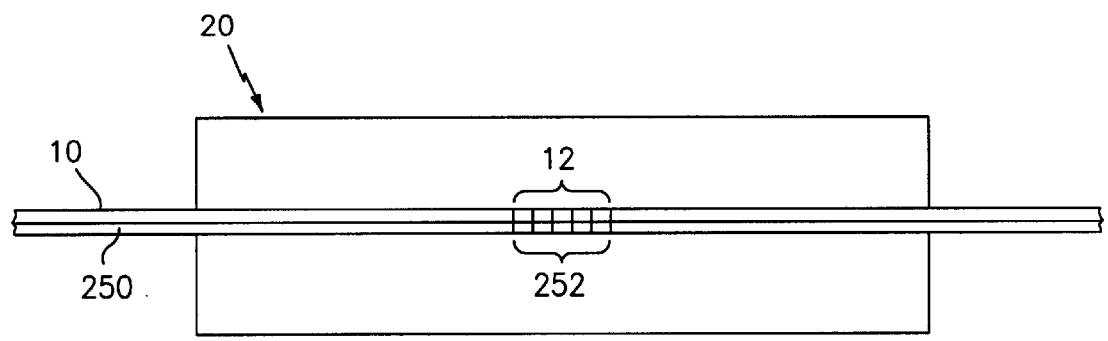
FIG. 9 is a side view of two fiber gratings on two separate optical fibers encased in a common tube, in accordance with the present invention.
Figure 10:
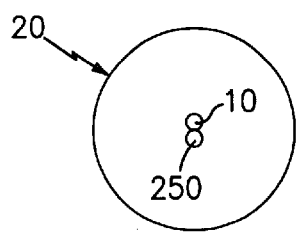
FIG. 10 is an end view of the embodiment of FIG. 9, in accordance with the present invention.

Referring to FIGS. 9 and 10, alternatively, two or more fibers 10,250, each having at least one grating 12,252 therein, respectively, may be encased within the tube 20. The gratings 12,252 may have the same reflection wavelengths and/or profiles or different wavelengths and/or profiles. In that case, the bore hole in the tube 20 prior to heating and fusing the tube 20 would be large enough to contain both fibers 10,250 and may be other than circular, e.g., square, triangle, etc. Also, the bore hole for the tube 20 need not be centered along the center line of the tube 20.

Figure 11:
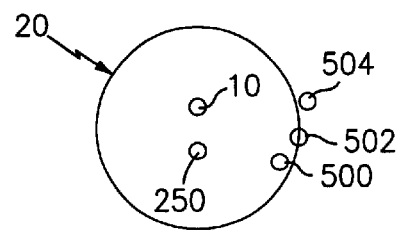
FIG. 11 is an end view of two fiber gratings on two separate optical fibers encased in a common tube and separated by distance, in accordance with the present invention.

Referring to FIG. 11, alternatively, instead of the fibers 10,250 touching each other as shown in FIG. 10, the fibers 10,250 may be spaced apart in the tube 20 by a predetermined distance. The distance may be any desired distance between the fibers 10,250 and have any orientation within the outer diameter of the tube 20. Also, for any of the embodiments shown herein, as discussed hereinbefore, part or all of an optical fiber and/or grating may be fused within, partially within, or on the outer surface of the tube 20, as illustrated by fibers 500,502,504, respectively.

Figure 12:
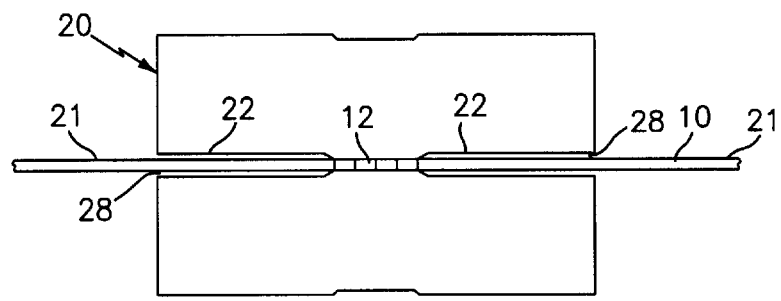
FIG. 12 is a side view of a tube-encased fiber grating where the tube is fused on the fiber only over the length of the grating, in accordance with the present invention.

Referring to FIG. 12, alternatively, the tube 20 may be fused onto the fiber 10 only where the grating 12 is located. In that case, if the tube 20 is longer than the grating 12, the inner tapered or flared regions 22 discussed hereinbefore may exist and the areas 28 between the tube 20 and the fiber 10 may be filled with a filler material, as discussed hereinbefore. Also, the term "tube" as used herein may also mean a block of material having the properties described herein.

Further, for any of the embodiments shown herein, instead of the fiber 10 passing through the housing 50,70,90 or the tube 20, the fiber 10 may be single-ended, i.e., only one end of the fiber 10 exits the housing or the tube 20. In that case, one end of the fiber 10 would be at or prior to the exit point of the fiber 10 from the tube 20 or the housing 50,70,90.

Figure 17:
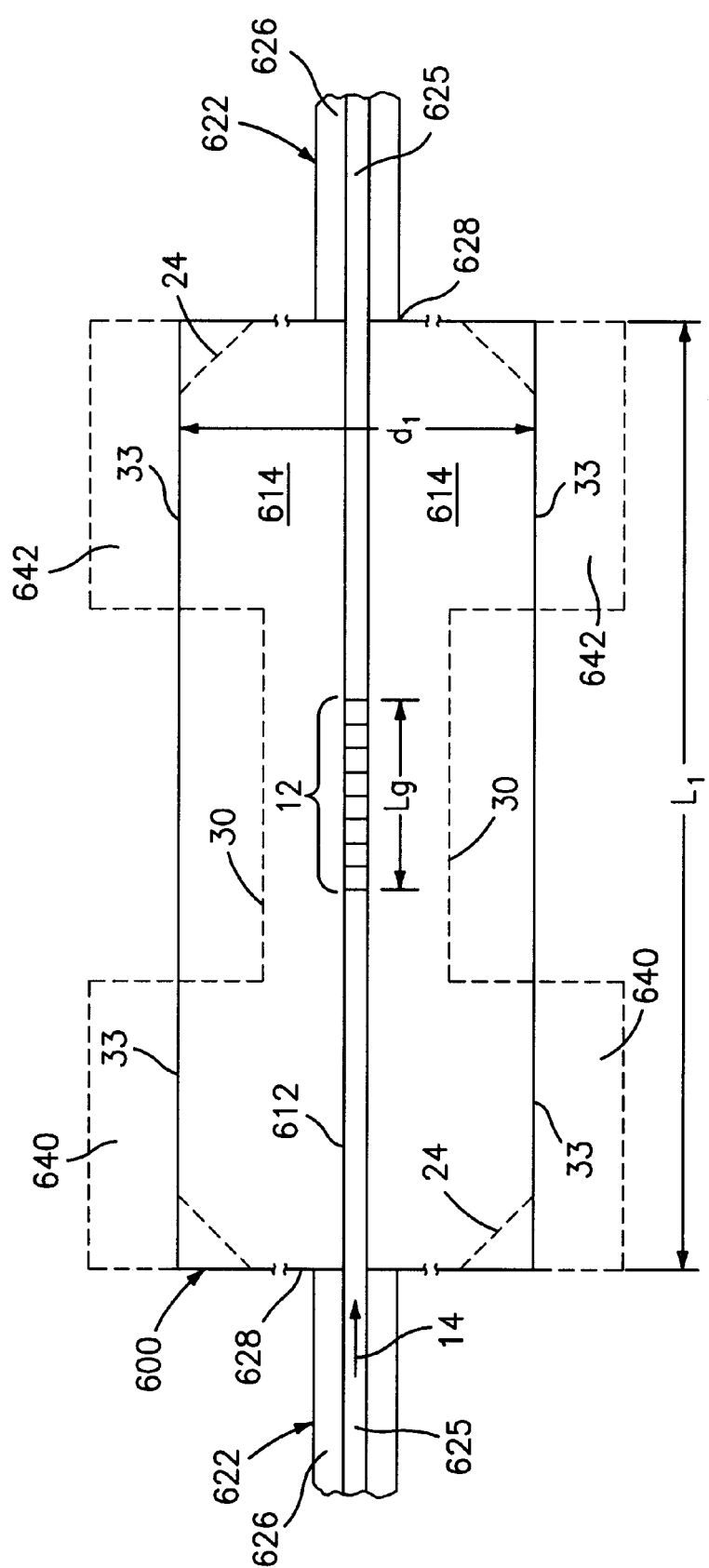
FIG. 17 is a side view of a large diameter optical waveguide having a grating disposed therein, in accordance with the present invention.

Referring to FIG. 17, alternatively, a portion of or all of the tube-encased fiber grating 20 may be replaced by a large diameter silica waveguide grating 600, such as that described in copending U.S. patent application Ser. No. 09/455,868, entitled "Large Diameter Optical Waveguide, Grating and Laser", which is incorporated herein by reference. The waveguide 600 has a core 612 (equivalent to the core of the fiber 10) and a cladding 614 (equivalent to the fused combination of the tube 20 and the cladding of the fiber 10) and having the grating 12 embedded therein. The overall length L1 of the waveguide 600 and the waveguide diameter d2 are set the same as that described hereinbefore for the tube 20 (i.e., such that the tube 20 will not buckle over the desired grating wavelength tuning range) and the outer diameter of the waveguide is at least 0.3 mm. An optical fiber 622 (equivalent to the fiber 10 in FIG. 1) having a cladding 626 and a core 625 which propagates the light signal 14, is spliced or otherwise optically coupled to one or both axial ends 628 of the waveguide 600 using any known or yet to be developed techniques for splicing fibers or coupling light from an optical fiber into a larger waveguide, that provides acceptable optical losses for the application.

The large diameter waveguide with grating 600 may be used in the same ways as the tube encased grating 20 is used herein where the fiber 10 is analogous to (and interchangeable with) the core 612 of the waveguide 600. For example, the waveguide 600 may be etched, ground or polished to achieve the "dogbone" shape described hereinbefore with the tube 20. Alternatively, the "dogbone" shape may be obtained by heating and fusing two outer tubes 640,642 onto opposite ends of the waveguide 600.

All other alternative embodiments described herein for the tube 20 and the tube-encased grating are also applicable to the waveguide 600 where feasible, including having a fiber laser or a DFB fiber laser, multiple fibers (or cores), various geometries, etc.

The tube-encased fiber grating 20 and the large diameter waveguide grating 600 may each also be referred to herein as a "tunable optical element". The tube-encased grating 20 and the large diameter waveguide grating 600 have substantially the same composition and properties in the locations where the tube 20 is fused to the fiber 10, because the end (or transverse) cross-section of the tube-encased grating 20 and the large diameter waveguide grating 600 are contiguous (or monolithic) and made of substantially the same material across the cross-section, e.g., a glass material, such as doped and undoped silica. Also, in these locations both have an optical core and a large cladding.

Figure 31:
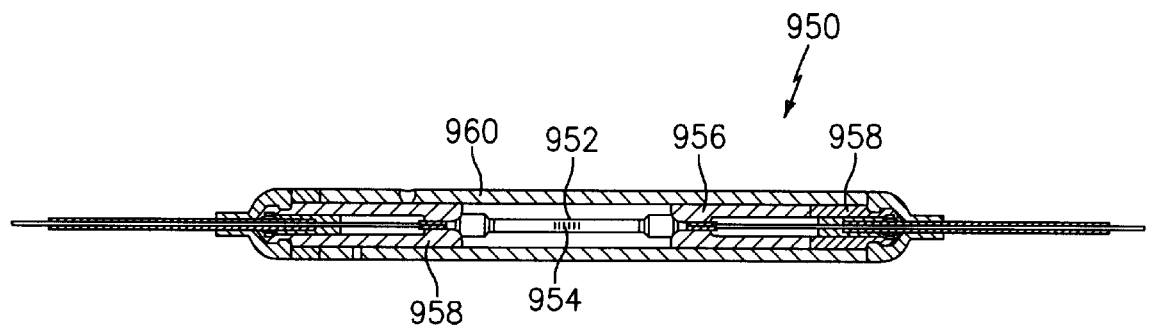
FIG. 31 is a cross-sectional view of a thermally compensated grating element in accordance with the present invention.

Also, the waveguide 600 and the tube-encased grating 20 may be used together to form any given embodiment of the sensing element described here in. In particular, one or more axial portion(s) of the sensing element may be a tube-encased grating or fiber and/or one or more other axial portion(s) may be the waveguide 600 which are axially spliced or fused or otherwise mechanically and optically coupled together such that the core of said waveguide is aligned with the core of the fiber fused to the tube. For example, a central region of the sensing element may be the large waveguide and one or both axial ends may be the tube-encased fiber which are fused together as indicated by dashed lines 650,652, or visa versa (FIGS. 1,11,31).

In the tunable grating-based laser embodiments shown in FIGS. 18–25, a laser element 700 includes a laser grating(s) 702 is written in a large diameter gain waveguide (i.e., cane) 704, having a single mode core <10 um diameter and doped with one or more of the rare-earths (e.g. Erbium or Erbium: Ytterbium) to provide gain, and a thick outer cladding to give the fiber an outer diameter of >300 um. The laser can either be a DFB fiber laser, where the grating is written in the core of the cane 704 (or tube-encased gain fiber), or a DBR laser, which consists of two Bragg grating end reflectors 702, either written in respective highly photosensitive cane elements (or respective tube-encased fibers) with a gain fiber spliced therebetween, or both written within a single cane element, which is formed of gain material, (or tube-encased gain fiber).

Figure 18:
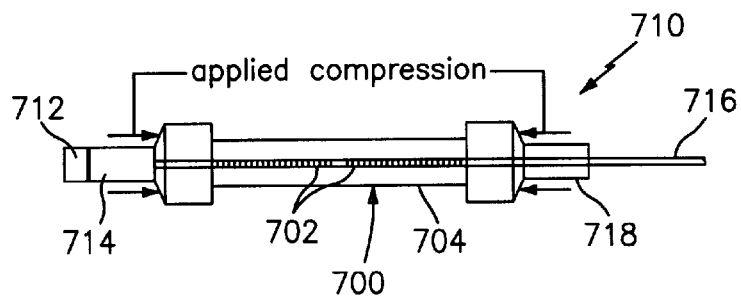
FIG. 18 is a side view of a tunable Bragg grating-based laser, in accordance with the present invention.
Figure 19:
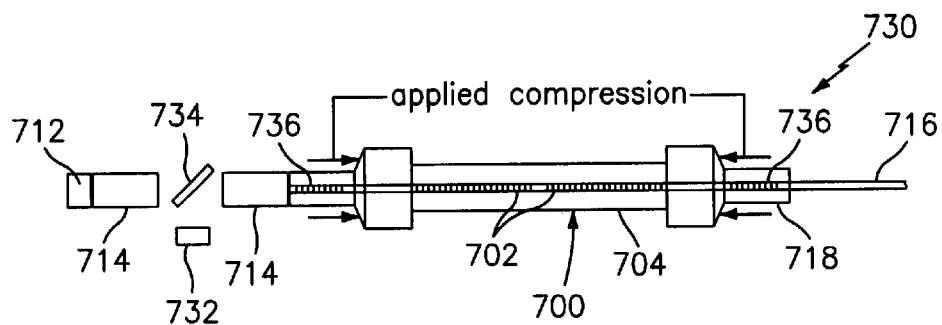
FIG. 19 is a side view of another embodiment of a tunable Bragg grating-based laser, in accordance with the present invention.

Referring to FIGS. 18 and 19, a compact, inexpensive compression-tuned Bragg grating-based laser 710 includes a bulk semiconductor pump laser chip 712, launching pump light into the Bragg grating laser cavity through a micro lens 714, e.g., a GRIN lens. Alternatively, the lens 714 can be part of the cane through machining of the end of the cane 704. A fiber output pigtail 716 inside a ferrule/glass capillary 718 is glued to the glass canter with the fiber 716 aligned to the laser element 700. The Bragg grating laser cavity should be designed to emit most light out of the output end by making an asymmetric laser cavity with respect to output coupling. The pump laser 712 can be directed inside the glass cane either at the input and/or at the output of the first laser cavity. The short distance between the pump chip 712 and the stabilizing grating 702 might require an anti reflection coating at the output facet of the pump chip. Normally grating stabilized pump lasers operate in the "coherence collapse" regime with a weak grating separated by ~1 m from the pump laser.

To monitor the laser power some of the laser output as shown in FIG. 19, either from the input or the output end of the laser 730, can be directed to a monitor detector 732 via a beam splitter 734. This can be used to control the output power of the laser and also to reduce the intensity noise of the laser through negative feedback to the pump.

The laser cavity inside the glass cane can be mechanically compressed to make a continuously wavelength tunable laser 730, basically using the same design, compression actuation and wavelength control as described hereinbefore. With pump reflector Bragg gratings (BGs) 736, these are disposed in a section of the glass cane 704 which is not under compression.

Figure 20:
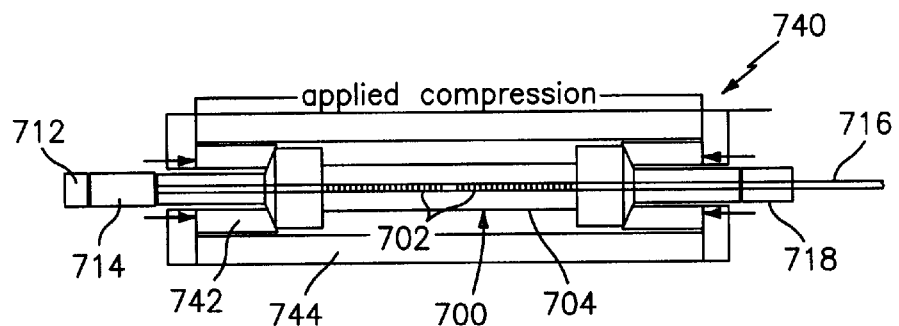
FIG. 20 is a side view of a temperature compensated Bragg grating-based laser, in accordance with the present invention.

Referring to FIG. 20, the tunable laser 740 provides a fixed laser wavelength with a high degree of wavelength stability can be realized by putting the glass cane 704 in compression with a section of material 742 with higher thermal expansion coefficient as a part of the compressed length. The housing 744 around the compressed length should have a low thermal expansion coefficient. The high thermal expansion material 742 will with increasing temperature compress the laser cavity to counter-act the positive wavelength shift caused by the temperature dependence of the refractive index of the laser element 700.

Figure 21:
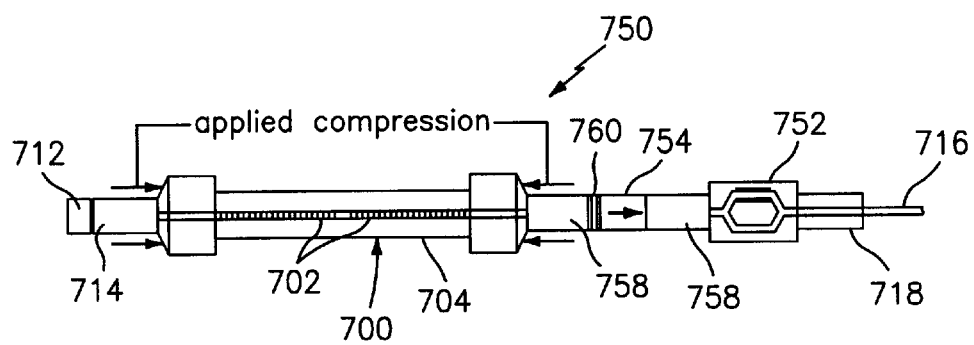
FIG. 21 is a side view of another embodiment of a tunable Bragg grating-based laser having a LiNbO$_3$ electro-optic Mach-Zehnder waveguide modulator, in accordance with the present invention.

Referring to FIG. 21, a Bragg grating laser 750 having an external modulator 752 is illustrated. Rather than using a pigtailed modulator, a bulk modulator could possibly be integrated in the fiber laser module. In this case a LiNbO3 electro-optic Mach-Zehnder waveguide modulator is aligned with the output of the laser passing a bulk optical isolator 754 put between two GRIN lenses 756,758. A dielectric pump stop filter 760 at the output of the laser is also included in this configuration.

Figure 22:
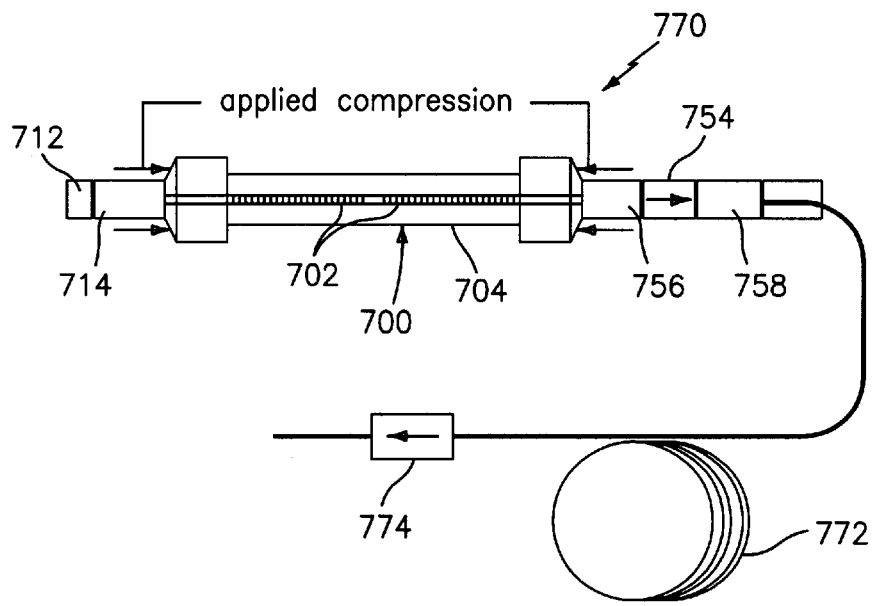
FIG. 22 is a side view of a tunable Bragg grating-based Master Oscillator Power Amplifier (MOPA), in accordance with the present invention.

In the case of an Erbium-only Bragg grating laser 770, the residual pump power at the output of the laser (very little pump power is absorbed in a short laser cavity) can be used to pump an EDFA 772 in a MOPA (Master Oscillator Power Amplifier) configuration, as illustrated in FIG. 22. Since an optical isolator 774 is needed between the laser and the amplifier, a 1480 nm pump source is needed, where the pump light will pass an optical isolator in the 1550 nm laser band.

Figure 23:
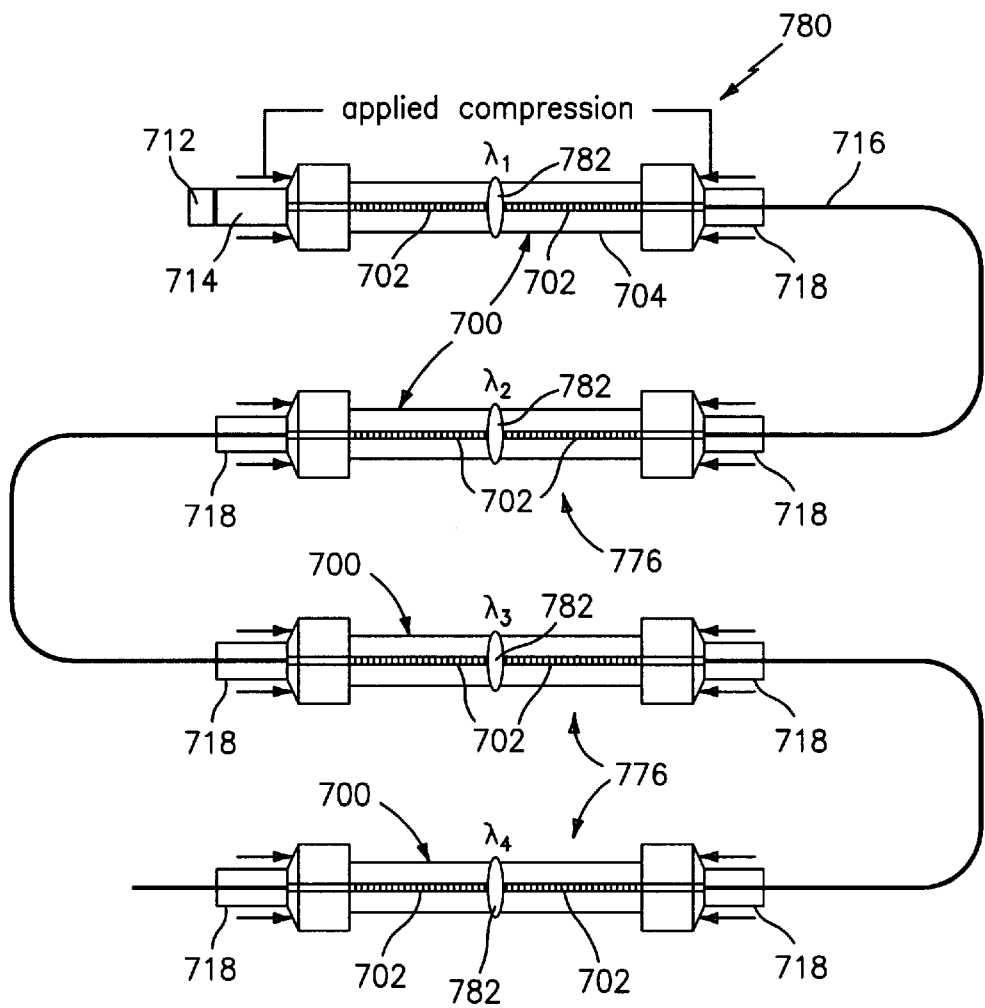
FIG. 23 is a side view of a plurality of Bragg grating based laser coupled in series, in accordance with the present invention.

Alternatively, as shown in FIG. 23, the residual pump power of the laser of FIG. 22 can also be used to pump several other Bragg grating lasers 776 that are optically connected in series, having different wavelengths. These can be compression-tuned separately or together. In making such a multi-wavelength laser array 780, all lasers will laser simultaneously. With Bragg grating-based DFB lasers, the individual lasers can be turned on/off by switching the optical phase-shift inside the laser grating 702, for example by applying local heating or a local strain at 782. This will enable a wavelength selective laser array. It could also provide a widely tunable laser by tuning laser 1 at $\lambda_1$ over a certain wavelength band with all other lasers off, then letting laser 2 at $\lambda_2$ take over to tune over the adjacent wavelength band while turning laser 1 off and so forth. Changing the phase shifts can also be used to control the relative power between the lasers, for example to dynamically equalize the powers. Note that changing the phase shift will also cause a shift in laser wavelength, with an amount depending on the position of the phase shift. This can be compensated for by changing the compression/strain (or temperature) of the laser. Alternatively changes in phase-shift can be used to modulate the laser frequency.

Figure 24:
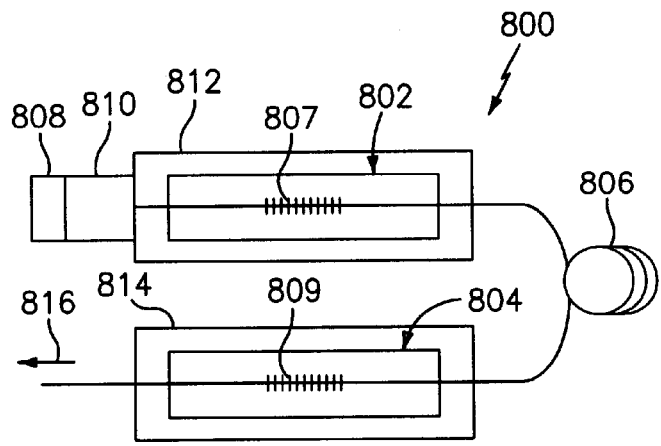
FIG. 24 is a side view of a tunable Bragg grating-based laser, in accordance with the present invention.

Referring to FIG. 24, another embodiment of a compression-tuned laser 800 includes a pair of large diameter silica waveguide grating elements 802, 804 (and/or a tube-encased fiber grating element), similar to that described hereinbefore, and a coil of gain fiber 806 (e.g. Erbium-doped fiber ("EDF").) optically disposed between the grating elements. A bulk semiconductor pump laser chip 808 launches pump light at 680 nm, 980 nm or 1480 nm, for example, through a micro lens 810 (e.g., a GRIN lens) into the gain fiber within the Bragg grating laser cavity. Alternatively, the lens 810 can be part of the first grating element 802 through machining of the end of the grating element. A pair of compression devices 812,814 independently tunes a grating 807,809 of each respective grating element 802,804 to a desired reflection wavelength corresponding to the desired lasing wavelength.

For example, as shown in FIG. 25A, the grating 807 of the first grating element 802 reflects a wavelength band of light 821, which is centered at respective reflection wavelength $\lambda_a$, while passing the other wavelength bands of light therethrough. Similarly, the grating 809 of the second grating element 804 reflects a wavelength band of light 823, which is substantially centered at the reflection wavelengths $\lambda_a$, while passing the other wavelength bands of light therethrough, as shown in FIG. 25B.

In the operation of the optical laser 800, the pump laser chip 808 and lens 810 provide a pump light to the gain fiber 806 through the first grating element 802. The grating of the first grating element 802 is tuned to reflect a selected wavelength band of the light centered at reflection wavelength $\lambda_a$, and the grating 809 of the other grating element 804 is tuned to reflect substantially the same wavelength band of pump light centered at reflection wavelength $\lambda_a$, to provide a lasing cavity having the gain fiber/element 806 disposed therein. The resulting output signal 816 comprises a wavelength band of light centered at the lasing wavelength at $\lambda_a$, as shown in FIG. 25C.

FIG. 25A provides a graphical representation 820 of the reflective characteristics (or filter function) 821 of the first tunable grating 802. FIG. 25B provides a graphical representation 822 of the grating characteristics (or filter function) 823 of the second tunable grating 804. FIG. 25C provides a graphical representation 824 the output signal 816 of the tunable laser 800 having a wavelength profile centered at a lasing wavelength $\lambda_a$, which corresponds to the reflection wavelengths $\lambda_a$ of the aligned filter functions 821,823. The graphs of FIGS. 25A–25C are aligned vertically to align the y-axis, which represents the attenuation in decibels (dB) of the filter functions 821,823 of the grating elements 802,804 and the gain of the output signal in decibels of the optical laser 800. The x-axis represents wavelength ($\lambda$) in nanometers (nm).

Each grating element 802,804 is tunable over a range 832,834 of wavelengths. As shown in FIGS. 25A and 25B, the full tunable range 830 of the laser 800 is the same as the tunable range 832,834 of the grating elements.

As shown the filter functions 821,823 of the grating elements 802,804 are substantially narrow, which provides a narrow output signal 816, however, one will appreciate that the widths of the filter functions may be any width to provide an output signal 816 having a desired width. Alternatively, as shown by the dashed lines in FIG. 25B, one of the grating elements 802 may have a narrow filter function 823 while the other grating element 804 may have a wider filter function 836. This advantageously requires less accuracy with aligning the filter functions 821,836, but still provide a narrow output signal 816.

While a pair of individual compression devices is shown to compression-tune each respective grating element 802, 804, the present invention contemplates a single compression device to concurrently tune both grating elements.

Further, while the grating elements 802 and 804 of the tunable laser of FIG. 24 are both tunable, the present invention contemplates that both of the grating elements are fixed (i.e., actively tunable) such that the center wavelength of the respective gratings of the grating elements remain at a substantially constant wavelength. In such an embodiment, a pair of athermal devices, such as that shown in FIG. 31, may be used to maintain the center wavelength of the respective gratings of the grating elements constant over a predetermined temperature range, which will be described in greater detail hereinafter. The athermal devices are similar to that described in U.S. patent application Ser. No. 09/699, 940, which is incorporated herein by reference.

While the grating elements 802 and 804 of the tunable laser of FIG. 24 are both tunable, one will appreciate that one grating element 804 may be fixed and the other grating element 802 is tunable. As shown in FIGS. 26A–26C, the filter function 840 of the fixed grating element 804 in FIG. 26B is sufficiently wide to extend over the entire tunable range 832 of the tunable grating element 802, which may have a narrow filter function. The output signal 816 of the laser, shown in FIG. 26C, is substantially the same as the narrow filter function 832 of the tunable grating element 802. As described hereinbefore, an athermal device, such as that shown in FIG. 31, may be used to maintain the center wavelength of the grating of the first grating element constant over a predetermined temperature range, which will be described in greater detail hereinafter.

Figure 41:
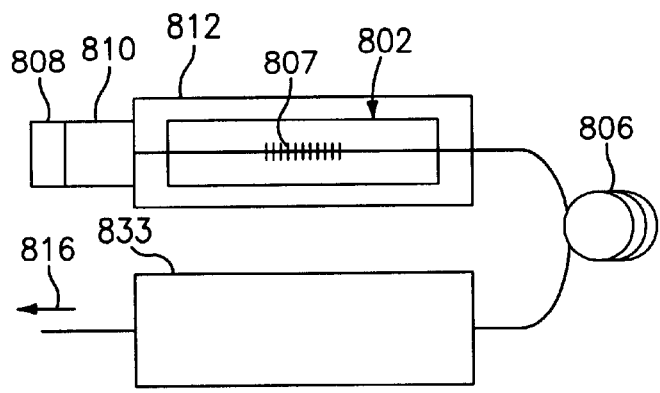
FIG. 41 is a side view of a tunable Bragg grating-based laser, in accordance with the present invention.

Referring to FIGS. 24 and 41, while the second grating element 804 provides a second reflective element 833 optically disposed at one end of the lasing cavity, one will appreciate that the present invention further contemplates that the second reflective element 833 may be a fiber having a fiber Bragg grating (FBG) disposed therein. The fiber Bragg grating may be athermalized, similar to that described in U.S. Pat. Nos. 6,181,851; 5,694,503 and 6,044,189, which are incorporated herein by reference, and/or may be tunable similar to that described in U.S. Pat. Nos. 5,999,546 and 5,999,671, which are incorporated herein by reference.

Another second reflective element 833 contemplated by the present invention includes a partially reflective mirror or other reflective surface that provides a broadband reflector. Further the second reflective element may comprise a Fabry Perot cavity that may have a fixed filter function or may be tunable. The Fabry Perot may also provide a filter function having a plurality of spectrally-spaced wavelength bands, similar to that described hereinafter.

Figure 27:
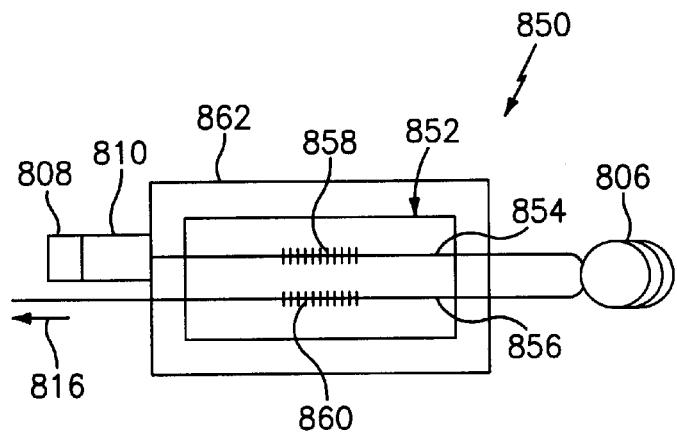
FIG. 27 is a side view of another embodiment tunable Bragg grating-based laser having a dual core grating element, in accordance with the present invention.

In another embodiment of the compression-tuned laser 800 of FIG. 24, a compression-tuned laser 850 of FIG. 27 includes a grating element 852 having a pair of cores 854, 856 with respective gratings 858,860 disposed therein, similar to that described hereinbefore. The cores are sufficiently spaced to prevent optical coupling or cross-talk therebetween. A gain fiber 806 having a gain material (i.e., Erbium-doped fiber) is optically connected between the gratings 858,860. The filter function of each respective grating is substantially narrow, similar to that shown in FIGS. 25A–25C. Further, the center wavelength of each respective grating 858,860 is substantially the same, and therefore aligned to provide the Bragg lasing cavity. In the operation of the laser 850, the compression device 862 simultaneously tunes the gratings 858,860 over the entire tuning range 830 of the laser 850, similar to that shown in FIGS. 25A–25C.

While the filter function 821,823 of the gratings 858,860 are both substantially narrow (see FIGS. 25A, 25B), the present invention contemplates one grating 858 having a substantially narrow filter function and the other grating 860 having a wider filter function 836, as shown in dashed lines in FIG. 25B. The wider filter function 836 enables loosening of the tolerances to align the center wavelengths $\lambda_a$ of the gratings 858,860. In addition, while the filter function of at least one grating is shown to be substantially narrow, the present invention contemplates that the filter function may be of various widths depending on the desire output signal profile.

While the laser 850 of FIG. 27 is actively tunable, the present invention contemplates not tuning the grating element 852 to provide a substantially fixed lasing wavelength, or alternatively, passively tuning the grating element 852 using an athermal device similar to that shown in FIG. 31 to maintain the output of the laser at a selected lasing wavelength over a desired temperature range.

Figure 28:
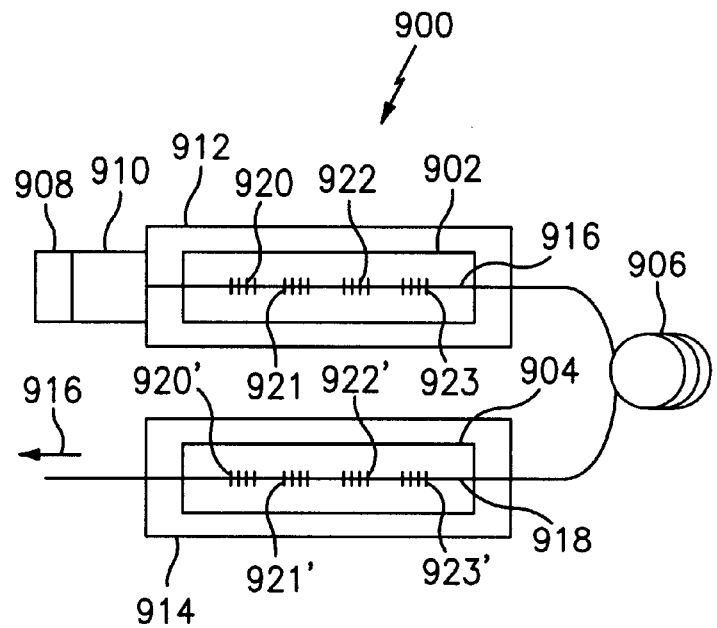
FIG. 28 is a side view of a tunable Bragg grating-based laser including a pair of grating elements having a plurality of respective gratings, in accordance with the present invention.

Referring to FIG. 28, to enhance the tuning range of a grating based single frequency laser for a given compression similar to that shown in FIG. 24, it is possible to provide a pair of grating elements 902,904 having a plurality of gratings 920–923,920'–923'– embedded in each respective core 916,918. The configuration is similar to the compression-tuned laser 800 of FIG. 24, except a set of gratings are embedded in the cores of each respective grating element 902,904. As shown, a pair of tuning devices 912,914 tunes each respective grating element 902,904 to provide continuous tuning over the desired tunable range, which will be described in greater detail hereinafter.

Figure 29A:
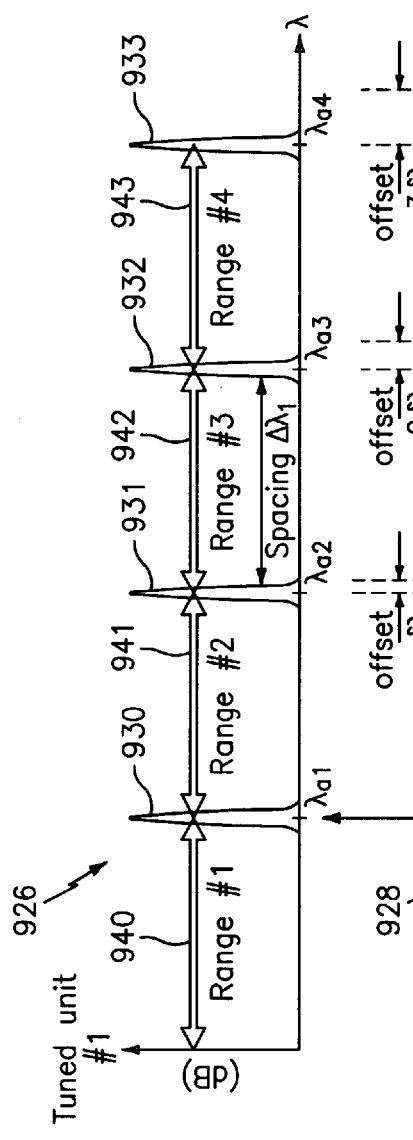
FIGS. 29A–29C are graphical representations of the filter functions of the grating elements and the output signal of the tunable laser of FIG. 28.
Figure 29B:
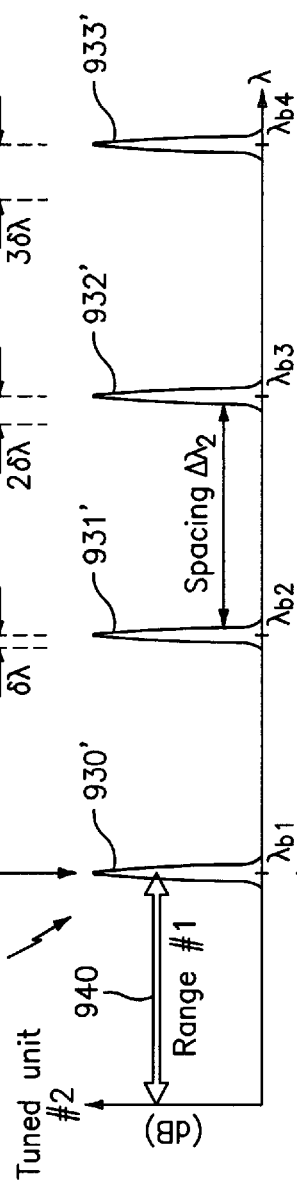
Figure 29C:
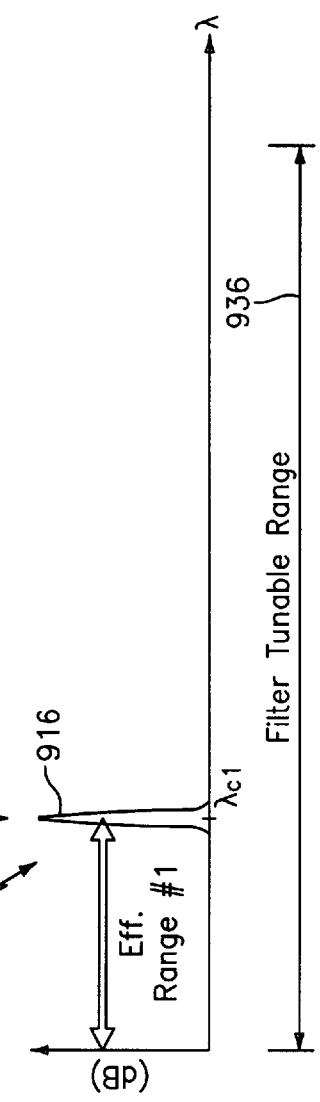

FIG. 29A provides a graphical representation 926 of the reflective characteristics of the first tunable grating element 902. FIG. 29B provides a graphical representation 928 of the grating characteristics of the second tunable grating element 904. FIG. 29C provides a graphical representation 929 of the output signal 916 of the optical laser 900. The graphs of FIGS. 29A–29C are aligned vertically to align the y-axis. The y-axes of FIGS. 29A and 29B represent the attenuation in decibels (dB) of the filtering functions 930–933,930'–933' of the grating elements 902,904. The x-axis the graphs of FIGS. 29A–29C represents wavelength ($\lambda$) in nanometers (nm).

The first multi-component grating element 902 reflects a plurality of wavelength bands of light, which are centered at the reflection wavelengths $\lambda_{a1}$–$\lambda_{a4}$ of each respective grating 920–923, for example, while passing the other wavelength bands of light through the gratings, as shown in FIG. 29A. Similarly, the second multi-component grating element 904 reflects a plurality of wavelength bands of light, which are centered at the reflection wavelengths $\lambda_{b1}$–$\lambda_{b4}$ of each respective grating 920'–923', for example, while passing the other wavelength bands of light through the gratings, as shown in FIG. 29B. The gratings 920–923, 920'–923' of each respective grating element 902,904 have different reflection wavelengths, separated by a predetermining spacing $\Delta\lambda_1$, $\Delta\lambda_2$. The gratings of each grating element 902,904 may be written over each other in a co-located manner, or may be written concatenated along the core 916,918 of each grating element.

In the operation of the optical filter 900, the pump laser chip 908 and lens 910 provide light at 680 nm, 980 nm or 1480 nm, for example, to the gain fiber 906 through the first tunable grating element 902. The first grating element 902 and the second grating element 904 are tuned to align a filter function 930–933,930'–933' of each grating element at the desired center wavelength or desired lasing wavelength. For example, as shown in FIGS. 29A–29C, the filter function 930,930' of the first grating 920,920' of each grating element 902,904 are aligned at the same wavelength (at $\lambda_{a1}$ and $\lambda_{b1}$, respectively) to provide a lasing wavelength (at $\lambda_{c1}$), which will be described in greater detail hereinafter.

Once a pair of gratings of the grating elements 902,904 are aligned as shown in FIGS. 29A–29C, the aligned gratings (920,920' for example) and the gain fiber 906 form a laser cavity that continually reflect light at the lasing wavelength (at $\lambda_{c1}$ for example), defined by the aligned wavelength bands (or filter functions) 930,930'. The grating elements 902,904 are then simultaneously tuned to lase the pump light to a desired wavelength within the tunable range of the grating element 940–943, as described hereinbefore.

As described hereinbefore in FIG. 29A, the reflective characteristics of the first tunable grating element 902 is defined by four respective optical filtering functions 930–933 centered nominally at reflection wavelengths $\lambda_{a1}$–$\lambda_{a4}$ respectively, which correspond to the gratings 920–923 of the first grating element 902. The reflection wavelengths $\lambda_{a1}$–$\lambda_{a4}$ of the gratings 920–923 are spaced equally (at spacing $\Delta\lambda_1$) over the tunable spectral range 936 of the optical laser 900. The spacing between each of the reflection wavelengths of the gratings represents the minimum tunable range of each grating. One will appreciate that the spacing $\Delta\lambda_1$ between the reflection wavelengths of the gratings 920–923 provides a wide spectral span to park the wavelength bands that are not aligned with the complementary wavelength band, as described hereinbefore. For example, the spacing ($\Delta\lambda_1$) between the filter functions 930–933 of gratings 920–923 provide a wide spectral gap to park the filter functions 931'–933' of gratings 921'–923' when filter functions 930, 930' are aligned.

Referring to FIG. 29B, the reflective characteristics of the second tunable grating element 904 is defined by four optical filtering functions 930'–933' centered at reflection wavelengths $\lambda_{b1}$–$\lambda_{b4}$ respectively, which correspond to the gratings 920'–923' of the second grating element. The spacing ($\Delta\lambda_2$) between the reflection wavelengths $\lambda_{b1}$–$\lambda_{b4}$ of the second grating element 904 is greater than the spacing ($\Delta\lambda_1$) between the reflection wavelengths $\lambda_{a1}$–$\lambda_{a4}$ of the first gratings 920–923 by an offset of $\delta\lambda$. In other words, spacing $\Delta\lambda_2$=$\Delta\lambda_1$+$\delta\lambda$. The spacing offset ($\delta\lambda$) assures that when the first and second grating elements 902,904 are tuned to align a selected reflection wavelength (i.e., $\lambda_{a1}$,$\lambda_{b1}$) of a pair of complementary gratings (i.e., 920,920'), the remaining reflection wavelengths (i.e., $\lambda_{a2}$–$\lambda_{a4}$,$\lambda_{b2}$–$\lambda_{b4}$) of the other complementary gratings (i.e., 921–923,921'–923') are offset.

For example, referring to FIGS. 29A–29C, both the first grating 920 of the complementary grating element 902 and the first grating 920' of the second grating element 904 are tuned simultaneously to align the respective reflection wavelengths at $\lambda_{a1},\lambda_{b1}$. When aligned, the remaining filter functions 931'–933' of the gratings 921'–923' are offset from the reflection wavelengths $\lambda_{a2}$–$\lambda_{a4}$ of the complementary gratings 921–923 respectively. Specifically, when the first gratings 920,920' of the first and second grating elements 902,904 are aligned, the reflection wavelengths $\lambda_{a2},\lambda_{b2}$ of the complementary gratings 921,921' are spaced by the offset ($\delta\lambda$), the reflection wavelengths $\lambda_{a3},\lambda_{b3}$ of the complementary gratings 922,922' are spaced by two times the offset ($2\delta\lambda$), and the reflection wavelengths $\lambda_{a4},\lambda_{b4}$ of the complementary gratings 923,923' are spaced by three times the offset ($3\delta\lambda$). The offset $\delta\lambda$ is such that a sufficient spacing between the reflection wavelengths exists to prevent crosstalk or interference between adjacent gratings.

FIG. 29C is representative of the output signal 916 of the tunable optical laser 900 centered at a wavelength $\lambda_{c1}$, which corresponds to the reflection wavelengths $\lambda_{a1},\lambda_{b1}$ of the aligned filter functions 930,930'. As described hereinbefore, the output signal 916 of the laser 900 is centered at the aligned reflection wavelengths at $\lambda_c$.

Each of the pairs of complementary gratings 920–923, 920'–923' is tunable over a range of wavelengths. As shown in FIGS. 29A–29C, the full tunable range 936 of the optical laser 900 is broken down into four tunable ranges 940–943 corresponding to the four pairs of complementary gratings. For example, the complementary gratings 920,920' of the first and second grating elements 902,904 respectively, may be tuned simultaneously to filter the wavelength bands within a first range 940. The complementary gratings 921, 921' may be tuned simultaneously to filter the wavelength bands within a second range 941. The complementary gratings 922,922' may be tuned simultaneously to filter the wavelength bands within a third range 942. The complementary gratings 923,923' may be tuned simultaneously to filter the wavelength bands within a fourth range 943.

FIG. 29C shows the resulting output signal 916 of the laser 900 that has an overall tunable range 936 equal to the four ranges 940–943 of each complementary pair of gratings.

One should recognize that while the spacing of the reflection wavelengths of the gratings 920–923,920'–923' of the first and second grating elements 902,904 are shown to be equally spaced, the spacing of the reflection wavelengths $\lambda_{a1}$–$\lambda_{a4}$, $\lambda_{b1}$–$\lambda_{b4}$ may be non-uniform, provided only one pair of complementary filter functions (i.e., 930,930') are aligned when any given pair of complementary filter functions are aligned.

Similar to FIGS. 29A–29C, FIG. 30A provides a graphical representation 926 of the reflective characteristics of the first tunable grating element 902 of the laser 900 of FIG. 28. FIG. 30B provides a graphical representation 928 of the grating characteristics of the second tunable grating element 904. FIG. 30C provides a graphical representation 929 of the output signal 916 of the optical laser 900.

FIG. 30B shows the filter functions 930'–933' shifted to the right by twice the offset ($2\delta\lambda$) so that the reflection wavelengths $\lambda_{a3},\lambda_{b3}$ of the complementary gratings 922, 922' are aligned as a result of a predetermined additional compression provided to the second grating element 904. It is important to note that when the complementary filter functions 932,932' are aligned, the other complementary filter functions are offset. Specifically, filter functions 930, 930' of the pair of complementary gratings 920,920' are offset by $-2\delta\lambda$; filter functions 931,931' of the pair of complementary gratings 921,921' are offset by $-\delta\lambda$; and filter functions 933,933' of the pair of complementary gratings 923,923' are offset by $\delta\lambda$.

FIG. 30C shows the resulting output signal 916 at wavelength $\lambda_{c3}$ having a tunable range equal to that of the range 942 of the complementary third gratings 922,922'.

In one embodiment, the grating elements 902,904 may be pre-strained to tune a pair of complementary gratings 920–923,920'–923' to the same reflection wavelength; such that a predetermined lasing wavelength is output by the laser in the normal or static state (i.e., no input command is present). For example as shown in FIGS. 29A–29C, the grating elements 902,904 are nominally set (e.g., pre-strained) such that the first complementary gratings 920,920' (the lowest wavelength gratings) are normally aligned. One will appreciate that the grating elements may be aligned in the normal state at any desired reflection wavelength. One will also appreciate that the grating elements may be set such that no reflection wavelengths are aligned in the normal state.

The tunable optical laser 900 may be tuned in a selection mode or a scanning mode of operation. In the selection mode, any wavelength band may be selected at any given time. To select a desired wavelength band, the first grating element 902 is compressed to tune the grating 920–923 of the selected range to the selected wavelength band. Simultaneously, the second grating element 904 is compressed to tune the grating 920'–923' of the selected range to the selected wavelength band while ensuring that no filter function aligns until the desired lasing wavelength is reached. As described hereinbefore, the second grating element 904 is additionally compressed to compensate for the nominal offset ($\delta\lambda$) of each grating for each range. For example as shown in FIGS. 30A–30C, the grating 9221' of the second grating element 904 is additionally compressed to compensate for the $2\delta\lambda$ offset.

In the scanning mode, the optical laser 900 can be sequentially scanned over the tunable range 936 as described hereinbefore. Typical applications in communications require tunability over a range of >35 nm for the "C" (conventional) band of the Er window (1525–1560) or the "L" (long) band. More recent applications require tenability over both the "C" and "L" bands, thereby doubling the required lasing range. The full tunable range may be scanned a number of different methods, for example, from highest to lowest wavelength, lowest to highest wavelength, or scanning each range independently in a non-sequentially manner. The method of tuning the grating elements to tune over the entire range is described in greater detail in U.S. patent application Ser. No. 09/751,589, which is incorporated herein by reference.

While the tunable optical laser 900 described hereinabove includes grating elements 902,904 having four gratings 920–923,920'–923', one will appreciate that any number of gratings may be written in the grating elements. For example in another embodiment, the tunable optical filter 10 may be tunable over both the "C" and "L" bands using, for example, eight (8) gratings in each tuned grating element 902,904.

While the tunable laser 900 of FIG. 28 is tunable to any desired wavelength within the tunable range 936, one will appreciate that the grating elements 902,904 are tuned such that any pair of gratings 920–923,920'–923' is aligned only at wavelengths representative of standard ITU channels for the specific channel spacing (e.g., 25, 50 and 100 GHz spacing) and not at wavelengths therebetween. For instance, when tuning the laser 900 from one ITU channel wavelength to the next ITU channel wavelength, the grating elements 902,904 are misaligned until the reflection wavelength of a pair of gratings reach the desired ITU channel at which time the grating elements are compressed to align the reflection wavelengths of the pair of gratings.

In another embodiment of the present invention, the optical laser is substantially similar to the laser 900 of FIG. 28, except the second grating element 904 is not tunable and therefore the filter profile 928 is fixed at predetermined wavelengths. For example, the filter functions 930'–933' of the gratings 920'–923' of the second grating element 904 are spaced spectrally to provide stepwise tuning in steps equal to the spectral separation between each filter function, which may be located to match the standard ITU grid.

To maintain the filter profile 928 of the gratings 920'–923' of the second fixed grating element 904 at the predetermined wavelengths over temperature, the second fixed grating element may be athermalized as shown in FIG. 31, which is similar to that disclosed in co-pending U.S. patent application Ser. No. 09/699,940 that is incorporated herein by reference in its entirety.

Referring to FIG. 31, a temperature compensated optical device 950 includes a compression-tuned glass element 952 having a Bragg grating 954 therein, a compensating material spacer 956 and end cap 958 all held within an outer shell 960. The element 952, end cap 958 and shell 960 are made of a material having a low coefficient of thermal expansion (CTE), e.g., silica, quartz, Kovar etc. and the spacer 956 is made of a material having a higher CTE, e.g., metal, Pyrex®, ceramic, etc. The material and length of the spacer 956 is selected to offset the upward grating wavelength shift due to temperature. As temperature rises, the spacer 956 expands faster than the silica structure causing a compressive strain to be exerted on the element 952, which shifts the wavelength of the grating 954 down to balance the intrinsic temperature induces wavelength shift up. As a result, the grating 954 wavelength is substantially unchanged over a wide temperature range.

While the present invention shows each end of the lasing cavity having an equal number of filter functions 930–933, 930'–933' (or gratings), the present invention contemplates an unequal number of filter functions disposed at the ends of the lasing cavity. For example, referring to FIGS. 29A–29C, the first grating element 902 may have two filter functions 930,932 (or gratings) and the second grating element 904 may have four filter functions 930',933' (or gratings). This embodiment therefore requires the first set of gratings 920, 922 to be compressed-tuned over a tuning range equaling approximately both the tuning range #1 940 and tunable range #2 941.

While the second grating element 904 of the laser 900 of FIG. 28 provides a second reflective element optically disposed at one end of the lasing cavity (similar to that 833 shown in FIG. 41), one will appreciate that the present invention further contemplates that the second reflective element may be a fiber having a single or plurality of fiber Bragg gratings (FBGs) and/or a sampled grating(s) disposed therein. As described hereinbefore, the fiber Bragg grating may be tunable and/or may be athermalized, similar to the laser shown in FIG. 32.

Another second reflective element contemplated by the present invention includes a Fabry Perot cavity that may have a fixed filter function or may be tunable. The Fabry Perot has a filter function having a plurality of spectrally-spaced wavelength bands, similar to that shown in FIG. 29B. Alternatively, the second reflective element may include a partially reflective surface that is coated with a light reflective and/or absorptive coating to reflect a desired wavelength band(s).

Figure 32:
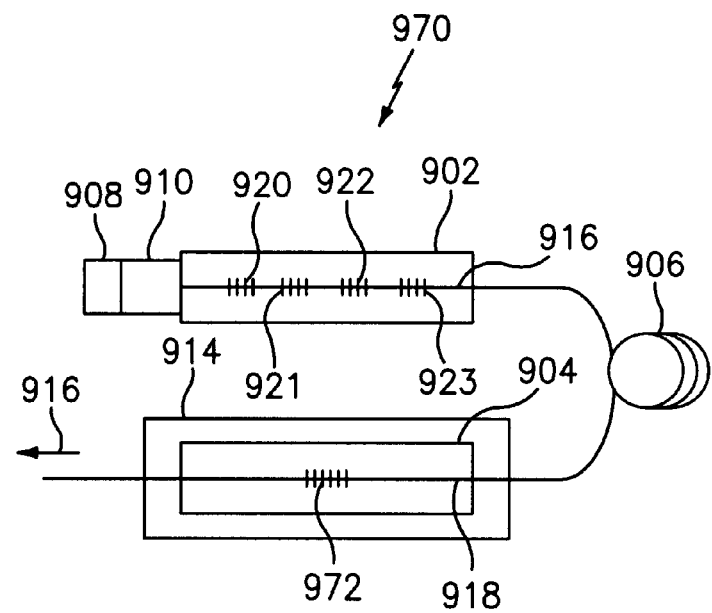
FIG. 32 is a side view of another embodiment of a tunable Bragg grating-based laser, in accordance with the present invention.

FIG. 32 shows an embodiment of a tunable laser 970 similar to that shown in FIG. 28, except the first grating element 902 is fixed or athermalized, as described hereinbefore. In other words, the gratings 920–923 of first grating element 902 is not selectively tunable such that the filter functions 930–933 of the gratings 920–933 remain substantially stationary along the spectral axis. Further, the second grating element 904 is tunable and includes a single grating 972 disposed in the core 918. Referring to FIG. 33B, the filter function 974 of the grating 972 is wider than the filter functions 930–933 of the gratings 920–923 of the first grating element 902. While grating element 904 shows a single grating 972 disposed therein, the present invention contemplates grating element 904 having more than one grating provided the gratings of 904 do not simultaneously overlap a plurality gratings 920–923 of grating element 902.

Referring to FIGS. 32 and 33A–33C, the tunable range 976 of the grating 972 of the second tunable element 904 of the laser 970 is substantially the same as the overall tunable range 936 of the laser 970. As the second grating element 904 is compression-tuned, the laser 970 provides the resulting output signal 916 at wavelengths corresponding to the center wavelength $\lambda_{a1}$ of the respective gratings 920–923 of the first grating element 902. As the filter function 974 of the grating 972 moves along the spectral axis, the output signal 916 of the laser 970 corresponds to the filter function of the grating 930–933 that of the first grating element 902 that overlaps with the grating 972 of the second grating element 904. The width of the filter function 974 of the second grating element 904 may be of any desirable width, provided the width is less than the spacing ($\Delta\lambda_{-1}$) of the center wavelengths of the gratings 920–923 of the first grating element 902. One will appreciate that the wider the filter function of the grating, the shorter the time period that the laser provides no output signal 916 as the laser 970 is tuned to each sequential lasing wavelength. Further, the wider filter function 974 of the grating 972 permits less accuracy necessary to align the filter functions 930,974, but still provide a narrow output signal 916.

While the second grating element 904 of the laser 970 of FIG. 32 provides a second reflective element optically disposed at one end of the lasing cavity, one will appreciate that the present invention further contemplates that the second reflective element may be a fiber having a single or plurality of fiber Bragg gratings (FBGs) and/or a sampled grating(s) disposed therein. As described hereinbefore, the fiber Bragg grating may be tunable and/or may be athermalized, similar to the laser shown in FIG. 32.

Another second reflective element contemplated by the present invention includes a Fabry Perot cavity that may have a fixed filter function or may be tunable. The Fabry Perot has a filter function having a plurality of spectrally-spaced wavelength bands, similar to that shown in FIG. 29B. Alternatively, the second reflective element may include a partially reflective surface that is coated to reflect a desired wavelength band(s).

Figure 34:
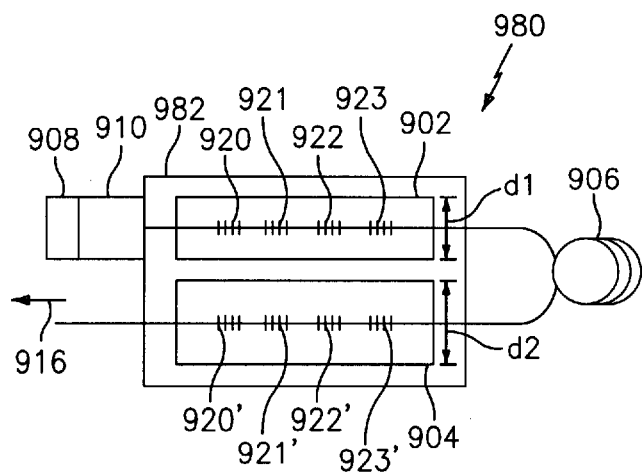
FIG. 34 is a side view of a tunable Bragg grating-based laser including a pair of grating elements having different outer transverse dimensions, in accordance with the present invention.

Referring to FIG. 34, another optical laser 980 embodying the present invention is shown. The laser 980 is similar to that shown in FIG. 28, except both grating elements 902,904 are compression-tuned by a single compression device 982. Consequently, the outer transverse dimension (e.g., outer diameter) of each respective grating element 902,904 has a different outer dimension. For example as shown, the outer dimension d2 of the second tunable grating element 904 is greater than the outer dimension d1 of the first tunable grating element 902. The different outer transverse dimensions cause the filter functions of the first set of gratings 920–923 to shift spectrally relative to the filter functions of the second set of gratings 920'–923' to enable the selective aligning of the respective pairs of filter functions, as described hereinbefore, to provide the desire output signal 916 over the tunable range 936 of the laser 980. The operation of the optical laser 980 is similar to the laser 990 of FIG. 35, which is described in greater detail hereinafter.

Figure 35:
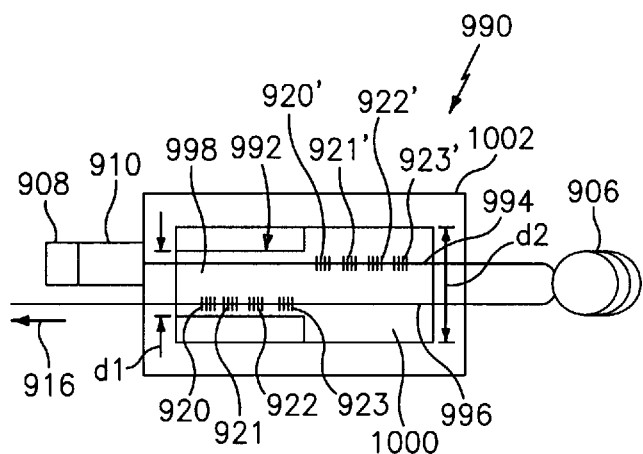
FIG. 35 is a side view of a tunable Bragg grating-based laser including a dual core grating element having portions with different outer transverse dimensions, in accordance with the present invention.

In another embodiment similar to the compression-tuned laser 980 of FIG. 34, a compression-tuned laser 990 of FIG. 35 includes a grating element 992 having a pair of cores 994,996 disposed therein, similar to that described hereinbefore. The cores are sufficiently spaced to prevent optical coupling and/or cross-talk therebetween. The outer traverse diameter d1 of one portion 998 of the grating element 992 is less than the outer traverse diameter d2 of another portion 1000 of the grating element. A first plurality of gratings 920'–923', similar to that shown in FIGS. 28, 29B and 34, is disposed in the first core 994 in the first portion 998 of the grating element 992 to provide the reflective elements of one end of the lasing cavity. A second plurality of gratings 920–923, similar to that shown in FIGS. 28, 29A and 34, is disposed in the second core 996 in the second portion 1000 of the grating element 992 to provide the reflective elements of the other end of the lasing cavity. A coil of gain fiber 906 (e.g. Erbium-doped fiber ("EDF")) is optically coupled to the grating element 992 such that the gain fiber is disposed between the sets of gratings 920–923, 920'–923' to form the lasing cavity.

In the operation of the laser 990, when the grating element is compressed, the filter profile of each set of gratings 920'–923',920–923 shift spectrally relative to each other because the shift in wavelength of the first filter function is different than the shift in wavelength of the second filter function for the same amount of compressive force applied to the grating element due to the different diameters d1,d2 of the respective portions 998,1000 of the grating element 992. The diameter of each portion and the spacing between the filter functions of each set of gratings 920'–923',920–923 may be defined such that when the grating is compressed by the compression device 1002 respective complimentary grating profiles aligned at predetermined wavelengths in a stepwise manner, such as at the ITU grid. For example, as the grating element 992 is compressed, the gratings align to provide a lasing output 916 at successive ITU grid wavelengths with a period of no output between ITU grid wavelengths. The period of no output is defined by the channel spacing of the ITU grid, width of the filter functions of the gratings and the number of gratings disposed in each core.

Figure 36:
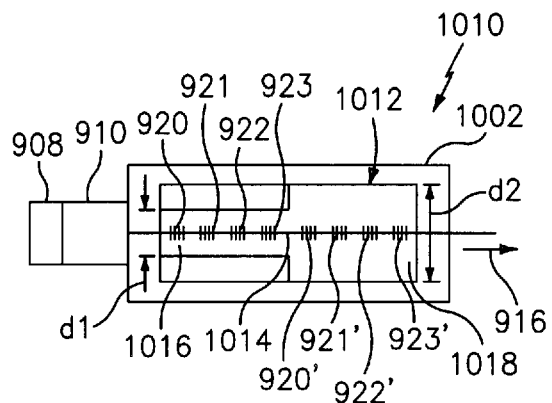
FIG. 36 is a side view of a tunable Bragg grating-based laser including a single core grating element having portions with different outer transverse dimensions, in accordance with the present invention.

FIG. 36 illustrates another embodiment of an optical laser 1010 that includes a single grating element 1012 having a core 1014 doped with a gain element, such as Erbium. The outer transverse diameter d1 of one portion 1016 of the grating element 1012 is less than the outer transverse diameter d2 of another portion 1018 of the grating element. A first plurality of gratings 920–923, similar to that shown in FIGS. 28, 29A and 34, is disposed in the first portion 1016 of the grating element 1012 to provide the reflective elements of one end of the lasing cavity. A second plurality of gratings 920'–923', similar to that shown in FIGS. 28, 29B and 34, is disposed in the second portion 1018 of the grating element 1012 to provide the reflective elements of the other end of the lasing cavity. The operation of the optical laser 1010 is similar to the laser 990 of FIG. 35, which is described in greater detail hereinbefore.

While the embodiments of FIGS. 28–36 provide a plurality of concatenated and/or collocated gratings 920–923, 920'–923' as the reflective element for the end(s) of the laser cavity, one will appreciate that the plurality of gratings may be substituted with a sampled Bragg grating to provide a DBR laser. The sampled Bragg grating is similar to a conventional sampled fiber Bragg grating shown in FIG. 37. A sampled Bragg grating is defined as a grating having a refractive index modulation amplitude (and/or phase) that is modulated periodically along the structure. In other words, the grating 1100 has a refractive index that is substantially periodically modulated. Further, the individual gratings (i.e., refractive index changes) of the sampled gratings 1100 are in phase. An example of a DBR laser having sampled gratings is described in an article by Michael C. Larsen et al., entitled "Monolithic Widely-Tunable Sampled-Grating DBR Lasers", Agility Communications, internet website www.agility.com/what/pdf/NFOEC2001 paperfinal.pdf.

Figure 37:
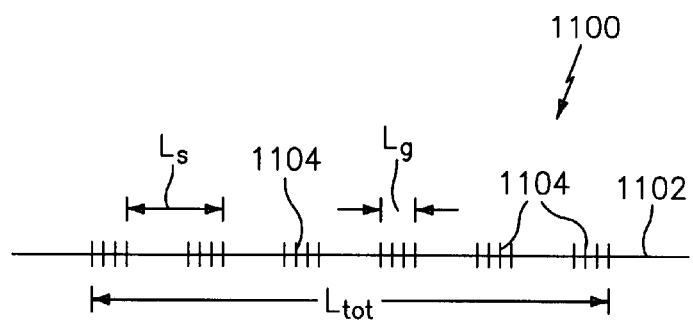
FIG. 37 is a side view of a sampled grating in accordance with the present invention.
Figure 38:
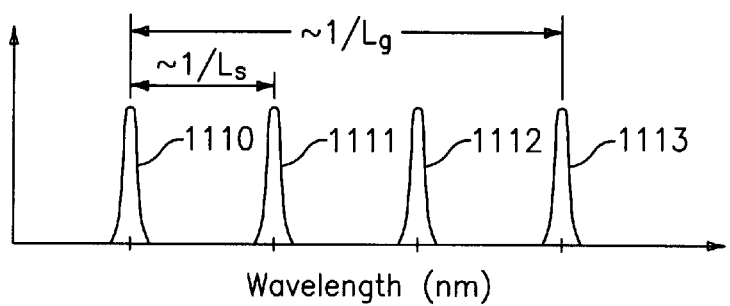
FIG. 38 is a graphical representation of the filter function of the sampled grating of FIG. 37.

FIG. 37 shows the basic structure of a conventional sampled fiber Bragg grating 1100. The grating is effectively partitioned into segments 1104 of length Lg separated by the sample period Ls, along an optical fiber 1102. The ratio Lg/Ls is referred to as the duty cycle. In the reflection spectrum, a constant sample period Ls' gives to multiple reflection peaks or filter functions with substantially identical characteristics about a central wavelength, which is determined by the grating period; whereas the segment length Lg determines the number of reflection peaks or filter functions 1110–1113, as shown in FIG. 38. Each filter function 1110–1113 may be disposed at a wavelength on the ITU grid. Specifically, Ls is inversely proportional to the resulting channel spacing and Lg is inversely proportional to the number of resulting useful channels.

Also the length of each grating element 902,904, having a sampled grating may be >20 mm to provide sufficient reflection over a wide wavelength range. For a relatively long cavity length, the sampled grating DBR laser may mode-hop between neighboring longitudinal cavity modes due to the small longitudinal mode-spacing relative to the bandwidth of each reflection peak. Consequently, the length of the coil of gain fiber 798 may to relatively short to reduce mode-hopping One will also appreciate that the reflective element at the end(s) of the lasing cavity may be formed of interleaved sampled and/or chirped optical waveguide gratings, similar to those described in U.S. Pat. No. 6,317,539, entitled "Interleaved Sampled and Chirped Optical Waveguide Gratings for WDM Channel Operations and Resulting Devices", which is incorporated herein by reference in its entirety.

To provide the necessary accuracy to precisely tune the gratings of FIGS. 24–38, the tunable grating units, which comprise the compression device and grating element, compression-tune the grating element using a non-optical closed control loop. The compression-tuned grating units as will be described in greater detail hereinafter, are similar to that disclosed in co-pending U.S. patent application, Ser. No. 09/456,112 entitled "Compression Tuned Bragg Grating and Laser", filed Dec. 6, 1999, and co-pending U.S. patent application, Ser. No. 09/455,868 entitled "Large Diameter Optical Waveguide, Grating, and Laser", which are incorporated herein by reference in their entirety.

Figure 39:
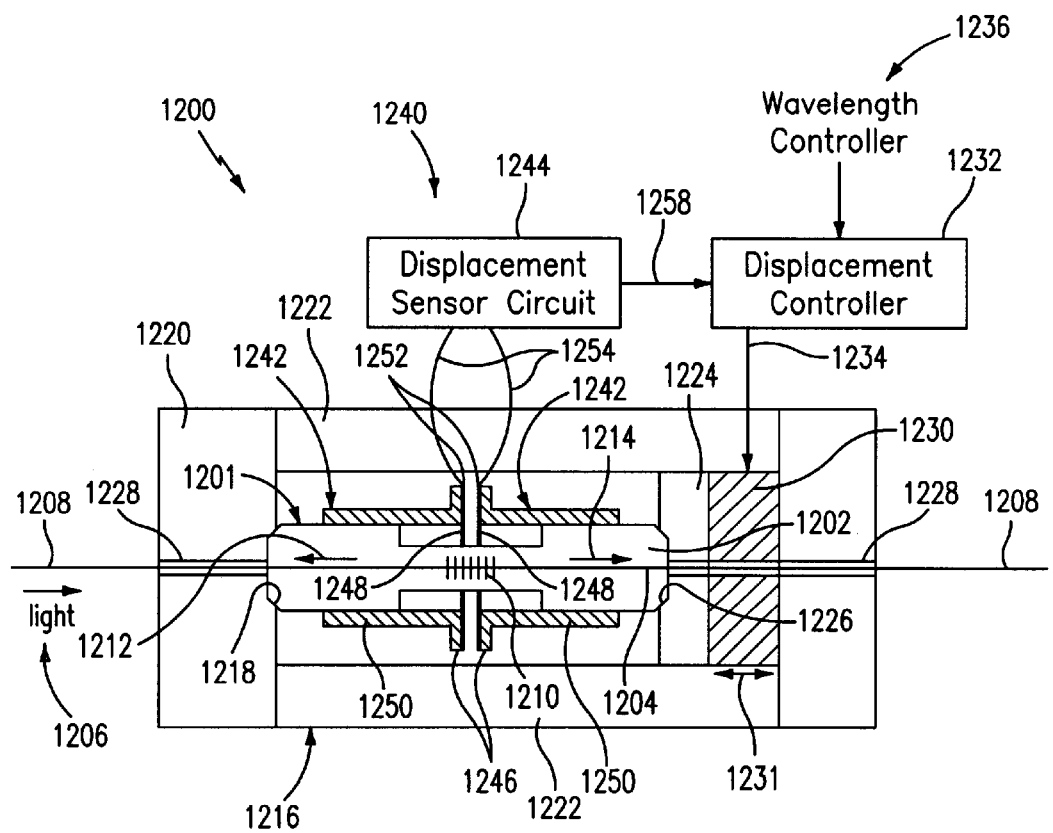
FIG. 39 is a cross-sectional view of a tunable grating unit in accordance with the present invention.

FIG. 39 illustrates such a compression-tuned Bragg grating unit 1200. The optical grating element 1201, for example, provided in the compression-tuned Bragg grating unit 1200 may be a bulk or large diameter optical waveguide, having an outer cladding 1202 and an inner core 1204. The grating element 1201 has an outer diameter of at least 0.3 mm and comprises silica glass ($SiO_2$) having the appropriate dopants, as is known, to allow light 1206 to propagate along the inner core 1204. The grating element (large diameter optical waveguide) may be formed by using fiber drawing techniques now know or later developed that provide the resultant desired dimensions for the core and the outer dimensions discussed hereinbefore, similar to that disclosed in co-pending U.S. patent application, Ser. No. 09/455,868 entitled "Large Diameter Optical Waveguide, Grating, and Laser". The grating element may then be etched, grounded or machined to form a "dogbone" shape, as will be described in hereinbefore. A pair of fibers or "pigtails" 1208 may be attached to the ends of the grating element 1201 by known techniques, such as epoxy or glass fusion)

Alternatively, the optical grating element 1201 may be formed by heating, collapsing and fusing a glass capillary tube to a fiber (not shown) by a laser, filament, flame, etc., as is described in copending U.S. patent application, Ser. No. 09/455,865, entitled "Tube-Encased Fiber Grating", which is incorporated herein by reference. Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

A Bragg grating(s) 1210 is written (embedded or imprinted) into the inner core 1204 of the grating element 1201. The Bragg grating 1210 reflects a portion the light 1206 as indicated by an arrow 1212 having a predetermined wavelength band of light centered at a reflection wavelength $\lambda_b$, and passes the remaining wavelengths of the incident light 1206 (within a predetermined wavelength range), as indicated by an arrow 1214. The grating, as is known, is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention.

The grating element 1201 is axially compressed by a compression device or housing 1216. One end of the grating element 1201 is pressed against a seat 1218 in one end 1220 of the housing 1216. The housing also has a pair of arms (or sides) 1222, which guide a movable block 1224. The block 1224 has a seat 1226 that presses against the other end of the grating element 1201. The axial end faces of the grating element 1201 and/or the seats on mating surfaces 1218,1226 may be plated with a material that reduces stresses or enhances the mating of the grating element 1201 with the seat on the mating surfaces. The ends of the housing 1216 and the block 1224 have a bore 1228 drilled through them to allow the fiber 1208 to pass therethrough. Instead of the recessed seats 1218,1226, the end 1220 of the housing 1216 and the block 1224 may provide a planar surface for engaging flush with the respective ends of the grating element 1201.

The housing 1216 may be assembled such that a pre-strain or no pre-stain exists on the grating element 1201 prior to applying any outside forces.

An actuator 1230, such as a piezoelectric actuator, engages the moveable block 1224, which causes the block to move as indicated by arrows 1231. Accordingly, the PZT actuator 1230 provides a predetermined amount of force to the moving block 1224 to compress the grating element 1201, and thereby tune the grating(s) 1210 to desired reflection wavelengths. In response to control signal generated by a displacement controller 1232 via conductor 1234, the PZT actuator 1230 is energized to provide the appropriate compression force necessary to tune the grating element to the desired Bragg reflection wavelengths of the grating(s) 1210. The displacement controller 1232 adjusts the expansion and retraction of the actuator 1230 in response to an input command 1236 and a displacement sensor 1240 that provides feedback representative of the strain or compression of the grating element 1201 to form a non-optical closed-loop control configuration. In other words, light 1206 propagating through the network or device is not used to provide feedback for the tuning of the grating 1210.

In one embodiment, the displacement sensor 1204 includes a pair of capacitive elements 1242 and a displacement sensor circuit 1244, similar to that disclosed in copending U.S. patent application, Ser. No. 09/519,802 entitled, "Tunable Optical Structure Featuring Feedback Control", filed Mar. 6, 2000, which is incorporated by reference in its entirety. As shown in FIG. 39, each capacitive element 1242 is generally tubular having an annular ridge 1246 extending radially outward from an end, which provides a capacitive surface 1248. The capacitive elements 1242 are mounted to respective ends of the grating element 1201 at 1250 such that the capacitive surfaces 1248 are spaced a predetermined distance apart, for example, approximately 1–2 microns. Other spacings may be used if desired. The capacitive elements 1242 may be bonded or secured using an epoxy or other adhesive compound, or fused to grating element 1201 using a $CO_2$ laser or other heating element. The capacitive surfaces 1248 are coated with a metallic coating, such as gold, to form a pair of annular capacitive plates 1252. The change in capacitance depends on the change in the spacing between the capacitive plates.

Electrodes 1254 are attached to the capacitive plates 1252 to connect the capacitor to the displacement sensor circuit 1244. The sensor circuit 1244 measures the capacitance between the capacitive plates 1252; and provides a sensed signal 1258, indicative of the measured capacitance, to the displacement controller 1232. As the grating element 1201 is strained, the gap between the parallel capacitive plates 1252 will vary, thereby causing the capacitance to change correspondingly. Specifically, as the grating(s) 1210 are compressed, the gap between the capacitive plates 1252 is reduced, resulting in an increase in capacitance. The change in capacitance is inversely proportional to the change in the reflection wavelength $\lambda_B$ of the grating(s) 1210. Since the capacitive elements 1242 are directly connected to the grating element 1201, the capacitive elements are passive and will not slip. One skilled in the art would be able to implement without undue experimentation, the sensor circuit 1244 to measure the change in capacitance between the two capacitive plates 1252.

In the operation of the grating unit 1200, the controller 1232 receives the wavelength input signal 1236, which represents the desired reflection wavelength to tune the grating unit. In response to the input signal 1236 and the sensed signal 1258, which is representative of the present reflection wavelengths of the grating(s) 1210, the controller 1232 provides a control signal to the actuator 1230 to increase or decrease the compression force applied to the grating element 1201 to set the desired reflection wavelengths of the grating(s) 1210. The change in applied force to the grating element 1201 changes the spacing between the ends of the grating(s) 1210, and therefore, the spacing between the capacitive plates 1252. As described above, the change in spacing of the capacitive plates 1252 changes the capacitance therebetween provided to the sensor circuit 1256, which provides displacement feedback to the controller 1232. While the sensor circuit 1256 and the controller 1232 has been shown as two separate components, one would recognize that the functions of these components may be combined into a single component. One example of a closed loop actuator 1230 that may be used is Model No. CM (controller) and DPT-CM (for a cylindrical actuator) made by Queensgate, Inc. of N.Y.

Although the invention has been described with respect to using a capacitor to measure the gap distance, it should be understood by those skilled in the art that other gap sensing techniques may be used, such as inductive, optical, magnetic, microwave, time-of-flight based gap sensors, similar to that described in U.S. patent application Ser. No. 09/950,509 and U.S. Pat. No. 6,310,990, which are incorporated herein by reference. Moreover, the scope of the invention is also intended to include measuring or sensing a force applied on or about the compressive element, and feeding it back to control the compression tuning of the optical structure. While the embodiment of the present invention described hereinbefore includes means to provide feedback of the displacement of the grating elements, one should recognize that the grating units may be accurately and repeatably compression and thus operating in an open loop mode.

Alternatively, instead of using a piezoelectric actuator 1230, the grating element 1201 may be compressed by another actuator, such as a solenoid, pneumatic force actuator, or any other device that is capable of directly or indirectly applying an axial compressive force on the grating element 1201. Further, a stepper motor or other type of motor whose rotation or position can be controlled may be used to compress the grating element. A mechanical linkage connects the motor, e.g., a screw drive, linear actuator, gears, and/or a cam, to the movable block 1224 (or piston), which cause the block 1224 to move as indicated by arrows 1232. The stepper motor may be a high resolution stepper motor driven in a microstepping mode.

Figure 40:
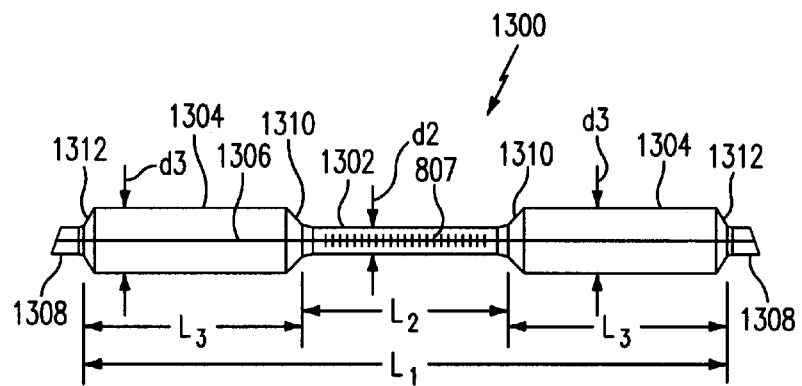
FIG. 40 is a side view of a grating element in accordance with the present invention.

Referring to FIG. 40, one embodiment of the large diameter optical waveguide 1300 (e.g., cane and collapsed tube) is shown, which is ground to provide a generally "dogbone" shape, as described hereinbefore. The waveguide includes a midsection 1302 disposed between a pair of axial ends 1304. A grating 807, a plurality of co-located Bragg gratings 920–923 or sample grating 1100 is disposed in the core 1306 of the midsection 1302 of the optical waveguide 1300. Advantageously, the dogbone shape provides increased sensitivity in converting force applied by the actuator 130 to wavelength shift of the multi-component grating to assure accurate tuning of the gratings 920–923.

The midsection 1302 may have an outer diameter d2 of about 0.8–1 mm, and a length L2 of about 5–20 mm. The axial ends 1304 each have a diameter d3 of about 3 mm and a length L3 of about 2–5 mm. The overall length L1 is about 10–30 mm and the multi-component grating has a length Lg of about 5–20 mm. Other lengths and diameters of the sections 1302,1304 may be used. Other dimensions and lengths for the grating element 1300 and the multi-component grating may be used.

An inner transition region 1310 of the large sections 1304 may be a sharp vertical or angled edge or may be curved. The grating element 1300 may have tapered (or beveled or angled) outer corners or edges 1312 to provide a seat for the tube to mate with housing 1220 and moving block 1224 (see FIG. 39) and/or to adjust the force angles on the grating element, or for other reasons. The angle of the beveled corners 1312 is set to achieve the desired function. In addition, one or both of the axial ends of the grating element 1300 where the fiber 1208 attaches may have an outer tapered (or fluted, conical, or nipple) axial section.

In one embodiment, the waveguide 1300 has an overall length of 26.5 mm, wherein the length of the midsection 1302 is 9.2 mm and the length of the axial ends 1304 are 7.0 mm each. The axial ends taper to the midsection at approximately 45 degrees. A nub 1308 extends axially from each axial end 1304, whereby an optical pigtail assembly 1310 is coupled to one of the nubs (see FIG. 31). The axial ends 1304 taper to the nubs 1308 at approximately 60 degrees. The outer diameter of the axial ends of the waveguide 1300 are approximately 2.5 mm, and the outer diameters of the midsection 1302 are approximately 0.9 mm and nubs 1308 are approximately 0.8 mm. The ends of the nubs are cut and polished at an angle of approximately 9 degrees.

The dimensions and geometries for any of the embodiments described herein are merely for illustrative purposes and, as such, any other dimensions may be used if desired, depending on the application, size, performance, manufacturing requirements, or other factors, in view of the teachings here in.

Further, the invention may be used with a co-doped distributed feedback laser arrangement similar to that described in the articles: J. Kringlebotn et al., "Er+3: Yb+3-Codoped Fiber Distributed-Feedback Laser", Optics Letters, Vol. 19, No. 24, pp 2101–2103 (December 1994); and H. Kogelnik et al, "Coupled-Wave Theory of Distributed Feedback Lasers", J. Appl. Phys., Vol. 43, No. 5, pp 2327–2335 (May 1972), which are incorporated herein by reference in their entirety.

It should be understood that, unless stated otherwise herein, any of the features, characteristics, alternatives or modifications described regarding a particular embodiment herein may also be applied, used, or incorporated with any other embodiment described here in. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A compression-tuned laser, comprising:
   a first optical waveguide, at least a portion of which having a transverse cross-section which is continuous and comprises a substantially homogeneous material, the at least portion of the first optical waveguide having an outer transverse dimension of at least 0.3 mm, the first optical waveguide including:
   an inner core disposed along the longitudinal axis of the first optical waveguide; and a first grating disposed within the core along the longitudinal axis, the grating reflecting a first reflection wavelength of light;
a second optical waveguide including:
an inner core disposed along the longitudinal axis of the second optical waveguide; and
a second grating disposed within the core along the longitudinal axis; and
an optical fiber including a gain material being optically disposed between the first and second optical waveguide;
wherein at least the first optical waveguide is axially compressed to change the first reflection wavelength reflected by the first grating.

2. The compression-tuned laser of claim 1, wherein the second grating has a filter function having a bandwidth at least as wide as the desired tunable range of the laser.

3. The compression-tuned laser of claim 1 further includes a compression device including an actuator to compress the first optical waveguide in response to a control signal.

4. The compression-tuned laser of claim 1, wherein the second optical waveguide is an optical fiber.

5. The compression-tuned laser of claim 1, wherein the second grating of the second optical waveguide is substantially fixed.

6. The compression-tuned laser of claim 1, wherein the second grating waveguide is athermalized.

7. The compression-tuned laser of claim 1, wherein the second optical waveguide is strained to change the second reflection wavelength of the second optical waveguide.

8. The compression-tuned laser of claim 7, wherein at least a portion of the second optical waveguide has a transverse cross-section which is continuous and comprises a substantially homogeneous material, and the at least portion of the second optical waveguide has an outer transverse dimension of at least 0.3 mm.

9. The compression-tuned laser of claim 1 wherein the first optical waveguide comprises:
an optical fiber, having the grating embedded therein; and
a tube, having said optical fiber and the grating encased therein along a longitudinal axis of said tube, said tube being fused to at least a portion of said fiber.

10. The compression-tuned laser of claim 1 wherein the first optical waveguide comprises a large diameter optical waveguide having an outer cladding and the inner core disposed therein.

11. The compression-tuned laser of claim 1, wherein the optical fiber comprises a doped fiber.

12. The compression-tuned laser of claim 1, wherein the optical fiber comprises an erbium-doped fiber.

13. The compression-tuned laser of claim 1, wherein at least a portion of the first tunable optical waveguide comprises a cylindrical shape.

14. The compression-tuned laser of claim 1, wherein the first tunable optical waveguide comprises a shape that provides a predetermined sensitivity to a shift in said wavelength due to a change in force on the first tunable optical waveguide.

15. The compression-tuned laser of claim 13, wherein said shape of the first tunable optical waveguide comprises a dogbone shape.

16. The compression-tuned laser of claim 1 further comprises a pump light source to provide pump light to the optical fiber having the gain material.

17. The compression-tuned laser of claim 1, wherein the second grating comprises a plurality of gratings, each of which having a respective filter function spaced spectrally.

18. The compression-tuned laser of claim 17, wherein the plurality of gratings are concatenated and/or collocated.

19. The compression-tuned laser of claim 17, wherein the plurality of gratings of the second grating have respective filter functions disposed along the ITU grid.

20. The compression-tuned laser of claim 17, wherein the gratings of the second optical waveguide is substantially fixed.

21. The compression-tuned laser of claim 17, wherein the first grating comprises a plurality of gratings, each of which having a respective filter function spaced spectrally.

22. The compression-tuned laser of claim 21, wherein at least a portion of the second optical waveguide has a transverse cross-section which is continuous and comprises a substantially homogeneous material, and the at least portion of the second optical waveguide has an outer transverse dimension of at least 0.3 mm and wherein the second optical waveguide is compression tunable.

23. The compression-tuned laser of claim 21, wherein only the filter function of one of the respective filter functions of the gratings of the first optical waveguide and one of the respective filter functions of the gratings of the second optical waveguide overlap when tuned over the desired spectral range.

24. The compression-tuned laser of claim 22, wherein only the filter function of one of the respective filter functions of the gratings of the first optical waveguide and one of the respective filter functions of the gratings of the second optical waveguide overlap when tuned over the desired spectral range.

25. The compression-tuned laser of claim 24 further includes a compression device including an actuator to simultaneously compress the first and second optical waveguide in response to a control signal, wherein the outer transverse dimension of the first optical waveguide is different than the outer transverse dimension of the second optical waveguide.

26. The compression-tuned laser of claim 24, wherein at least one of the gratings of the first and second optical waveguide is a sampled grating.

27. The compression-tuned laser of claim 26, wherein the at least one sampled grating is compression-tunable.

28. The compression-tuned laser of claim 26, wherein both of the sampled gratings is compression-tunable.

29. The compression-tuned laser of claim 1, wherein the at least portion of the first optical waveguide has an outer transverse dimension greater than about the dimension selected from the group consisting of 0.4 mm, 0.5 mm, 0.6 mm, 0.7 mm, 0.8 mm, 1.0 mm, 1.2 mm, 1.4 mm, 1.6 mm, 1.8 mm, 2.0 mm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, and 5.0 mm.

30. The compression-tuned laser of claim 1, wherein at least one of the first and second optical waveguides has an axial dimension greater than about the dimension selected from the group consisting of 3 mm, 5 mm, 7 mm, 9 mm, 10 mm, 12 mm, 14 mm, 16 mm, 18 mm, 20 mm, 21 mm, 23 mm, 25 mm, 27 mm, 29 mm, 30 mm, 32 mm, 34 mm, 36 mm, 38 mm, 40 mm, 45 mm, 50 mm, 55 mm, 60 mm, 65 mm, 70 mm, 75 mm, 80 mm, 85 mm, 90 mm, 95 mm, and 100 mm.

31. A compression-tuned laser comprising:
a tunable optical waveguide, at least a portion of which having a transverse cross-section which is continuous and comprises a substantially homogeneous material, the at least portion of the optical waveguide having an outer transverse dimension of at least 0.3 mm, the optical waveguide including:

an inner core disposed along the longitudinal axis of the optical waveguide, the inner core including a dopant to provide an optical gain; and a first grating and a second grating disposed within the inner core along the longitudinal axis, the first and second gratings being spaced a distance apart, the second grating having a plurality of gratings, each of which having a respective filter function spaced spectrally;

wherein the outer transverse dimension of the optical waveguide about the first grating is different than the outer transverse dimension of the optical waveguide about the second grating.

32. The compression-tuned laser of claim 31, wherein the first grating comprises a plurality of gratings, each of which having a respective filter function spaced spectrally.

33. The compression-tuned laser of claim 32, wherein only one grating of the first plurality of gratings aligns optically with one grating of the second plurality of gratings over the desired tuning range.

34. The compression-tuned laser of claim 32, wherein the center wavelengths of the gratings of the first and second plurality of gratings are spaced to provide stepwise tuning in steps equal to the spectral separation of the center wavelengths.

35. The compression-tuned laser of claim 32, wherein the steps match the ITU grid.

36. The compression-tuned laser of claim 32 wherein the second grating is a sampled grating.

37. The compression-tuned laser of claim 32 wherein at least one the first and second gratings is a sampled grating.

38. The compression-tuned laser of claim 31, wherein the at least portion of the optical waveguide has an outer transverse dimension greater than about the dimension selected from the group consisting of 0.4 mm, 0.5 mm, 0.6 mm, 0.7 mm, 0.8 mm, 1.0 mm, 1.2 mm, 1.4 mm, 1.6 mm, 1.8 mm, 2.0 mm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, and 5.0 mm.

39. The compression-tuned laser of claim 31, wherein the optical waveguide has an axial dimension greater than about the dimension selected from the group consisting of 3 mm, 5 mm, 7 mm, 9 mm, 10 mm, 12 mm, 14 mm, 16 mm, 18 mm, 20 mm, 21 mm, 23 mm, 25 mm, 27 mm, 29 mm, 30 mm, 32 mm, 34 mm, 36 mm, 38 mm, 40 mm, 45 mm, 50 mm, 55 mm, 60 mm, 65 mm, 70 mm, 75 mm, 80 mm, 85 mm, 90 mm, 95 mm, and 100 mm.

40. An optical laser comprising:

an optical waveguide, at least a portion of which having a transverse cross-section which is continuous and comprises a substantially homogeneous material, the at least portion of the optical waveguide having an outer transverse dimension of at least 0.3 mm, the optical waveguide including:

a pair of inner cores disposed along the longitudinal axis of the optical waveguide, the inner cores are spaced to minimize optical coupling therebetween;

a first grating being disposed within one core along the longitudinal axis; and a second grating being disposed within the other core along the longitudinal axis; and a gain element optically disposed between the pair of inner cores.

41. The optical laser of claim 40, wherein at least a portion of the respective filter functions of the first and second gratings spectrally overlap.

42. The optical laser of claim 40, wherein the optical waveguide is strained to change the reflection wavelength of the optical waveguide.

43. The optical laser of claim 42, wherein at least the first grating includes a plurality of gratings disposed in a first portion of the optical waveguide and the second grating disposed in a second portion of the optical waveguide, wherein the outer transverse dimension of the first portion of the optical waveguide is different than the outer transverse dimension of the second portion of the optical waveguide.

44. The optical laser of claim 43, wherein the second grating comprises a plurality of gratings, each of which having a respective filter function spaced spectrally.

45. The optical laser of claim 44, wherein only one of the respective filter functions of the first plurality of gratings overlaps with one of the respective filter functions of the second plurality of gratings over the desired spectral tuning range.

46. The optical laser of claim 45, wherein the center wavelengths of the gratings of the first and second plurality of gratings are spaced to provide stepwise tuning in steps equal to the spectral separation of the center wavelengths.

47. The optical laser of claim 43 wherein at least one the first and second gratings is a sampled grating.

48. The optical laser of claim 40, wherein the optical waveguide is athermalized.

49. The compression-tuned laser of claim 40, wherein the at least a portion of the optical waveguide has an outer transverse dimension greater than about the dimension selected from the group consisting of 0.4 mm, 0.5 mm, 0.6 mm, 0.7 mm, 0.8 mm, 1.0 mm, 1.2 mm, 1.4 mm, 1.6 mm, 1.8 mm, 2.0 mm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, and 5.0 mm.

50. The compression-tuned laser of claim 40, wherein the optical waveguide has an axial dimension greater than about the dimension selected from the group consisting of 3 mm, 5 mm, 7 mm, 9 mm, 10 mm, 12 mm, 14 mm, 16 mm, 18 mm, 20 mm, 21 mm, 23 mm, 25 mm, 27 mm, 29 mm, 30 mm, 32 mm, 34 mm, 36 mm, 38 mm, 40 mm, 45 mm, 50 mm, 55 mm, 60 mm, 65 mm, 70 mm, 75 mm, 80 mm, 85 mm, 90 mm, 95 mm, and 100 mm.

51. An optical laser comprising:

a first optical waveguide, at least a portion of which having a transverse cross-section which is continuous and comprises a substantially homogeneous material, the at least portion of the first optical waveguide having an outer transverse dimension of at least 0.3 mm, the first optical waveguide including:

an inner core disposed along the longitudinal axis of the first optical waveguide; and a first grating disposed within the core along the longitudinal axis; and a reflective element to reflect light at a desired wavelength band; and an optical fiber including an optical gain material, the fiber being optically disposed between the first optical waveguide and reflective element;

wherein at least the first optical waveguide is axially compressed to change the first reflection wavelength reflected by the first grating.

52. The optical laser of claim 51 wherein the reflective element comprises at least one of a Fabry Perot assembly, a partially reflective element; a second optical waveguide; and a second optical waveguide having a second grating disposed with a core.

53. The optical laser of claim 52 wherein the second optical waveguide is an optical fiber having a second grating disposed within the core along the longitudinal axis.

54. The optical laser of claim 51, wherein the second grating has a filter function having a bandwidth at least as wide as the desired tunable range of the laser.

55. The optical laser of claim 51 further includes a compression device including an actuator to compression tune at least the first optical waveguide in response to a control signal.

56. The optical laser of claim 53 further includes a strain tuning device to shift the filter function of the second grating along the spectral axis.

57. The optical laser of claim 53 further includes a thermal tuning device to shift the filter function of the second grating along the spectral axis.

58. The optical laser of claim 51, wherein the second reflective element comprises a second optical waveguide having an outer transverse dimension of at least 0.3 mm.

59. The optical laser of claim 51, wherein gain element comprises a doped fiber.

60. The optical laser of claim 51, wherein gain element comprises an erbium-doped fiber.

61. The optical laser of claim 51, wherein the first tunable optical waveguide comprises a shape that provides a predetermined sensitivity to a shift in said wavelength due to a change in force on the first tunable optical waveguide.

62. The optical laser of claim 51 further comprises a pump light source to provide pump light to the optical fiber having the gain material.

63. The optical laser of claim 51 wherein the reflective element has a filter function having at least two spaced reflection wavelength bands.

64. The optical laser claim 63 wherein the reflection wavelength bands are disposed along the ITU grid.

65. The optical laser of claim 63, wherein only a pair of respective filter functions of the first optical waveguide and the reflective element are aligned at substantially the same wavelength when tuned over the desired range.

66. The optical laser of claim 51, wherein the at least portion of the first optical waveguide has an outer transverse dimension greater than about the dimension selected from the group consisting of 0.4 mm, 0.5 mm, 0.6 mm, 0.7 mm, 0.8 mm, 1.0 mm, 1.2 mm, 1.4 mm, 1.6 mm, 1.8 mm, 2.0 mm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, and 5.0 mm.

67. The optical laser of claim 51, wherein the first optical waveguide has an axial dimension greater than about the dimension selected from the group consisting of 3 mm, 5 mm, 7 mm, 9 mm, 10 mm, 12 mm, 14 mm, 16 mm, 18 mm, 20 mm, 21 mm, 23 mm, 25 mm, 27 mm, 29 mm, 30 mm, 32 mm, 34 mm, 36 mm, 38 mm, 40 mm, 45 mm, 50 mm, 55 mm, 60 mm, 65 mm, 70 mm, 75 mm, 80 mm, 85 mm, 90 mm, 95 mm, and 100 mm.

68. The compression-tuned laser of claim 1, wherein the homogeneous material comprises a glass material.

69. The compression-tuned laser of claim 1, wherein the at least portion of the first optical waveguide is disposed at a portion of the first grating.

70. The compression-tuned laser of claim 1, wherein the inner core is a single mode core.

71. The compression-tuned laser of claim 31, wherein the homogeneous material comprises a glass material.

72. The optical laser of claim 40, wherein the homogeneous material comprises a glass material.

73. The optical laser of claim 51, wherein the homogeneous material comprises a glass material.

74. The optical laser of claim 51, wherein the at least portion of the first optical waveguide is disposed at a portion of the first grating.

75. The optical laser of claim 51, wherein the inner core is a single mode core.

* * * * *